US008714470B2

(12) United States Patent
Toma

(10) Patent No.: US 8,714,470 B2
(45) Date of Patent: May 6, 2014

(54) FISHING REEL

(75) Inventor: Hiroshi Toma, Tokyo (JP)

(73) Assignee: GlobeRide, Inc., Tokyo (JP)

(*) Notice: Subject to any disclaimer, the term of this patent is extended or adjusted under 35 U.S.C. 154(b) by 357 days.

(21) Appl. No.: 13/248,940

(22) Filed: Sep. 29, 2011

(65) Prior Publication Data

US 2012/0104135 A1 May 3, 2012

(30) Foreign Application Priority Data

Sep. 29, 2010 (JP) ................................ 2010-218797

(51) Int. Cl.
*A01K 89/01* (2006.01)

(52) U.S. Cl.
USPC .......................................... 242/273; 242/274

(58) Field of Classification Search
CPC .................................................. A01K 89/015
USPC ......... 242/228, 241, 242, 273, 274, 279, 310, 242/276
See application file for complete search history.

(56) References Cited

U.S. PATENT DOCUMENTS 1,448,786 A * 3/1923 Breen .......................... 242/276
4,750,684 A * 6/1988 Morimoto ..................... 242/310
6,053,444 A 4/2000 Yamaguchi et al.
7,270,288 B2 * 9/2007 Baenziger et al. ............ 242/274
7,871,030 B2 * 1/2011 Chang .......................... 242/229
RE43,695 E * 10/2012 Baenziger et al. ............ 242/274

FOREIGN PATENT DOCUMENTS

CN 1193455 9/1998
JP 01-165329 6/1989

OTHER PUBLICATIONS

Chinese Office Action dated Jul. 11, 2013 for Appln. No. 201110293557.5.

* cited by examiner

*Primary Examiner* — Emmanuel M Marcelo
(74) *Attorney, Agent, or Firm* — Pillsbury Winthrop Shaw Pittman, LLP

(57) ABSTRACT

A fishing reel that includes line guide (23) with fishing line guide hole (24) formed into a rectangular shape as viewed from the front of the guide body (22) extending in the right-and-left-direction along the axis of spool (5); and pillar (30) movable in a vertical direction in the vicinity in the anterior posterior direction of the line guide (23). The pillar (30) includes fishing line guide member (31) extending along the axis. The pillar (30) is configured to be movable between a first position where the fishing line is held in the center portion (24*c*') and a second position retracted from the first position. The pillar (30) may take the first position by moving downwardly for fishing line winding operation to cause the fishing line guide member (31) to guide the fishing line to the center portion (24*c*') of the fishing line guide hole (24).

13 Claims, 14 Drawing Sheets

FIG. 13b
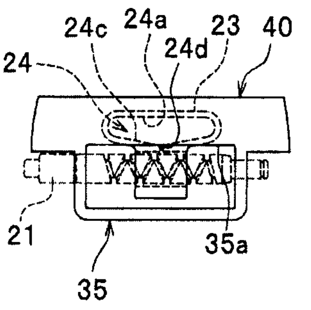
FIG. 13a
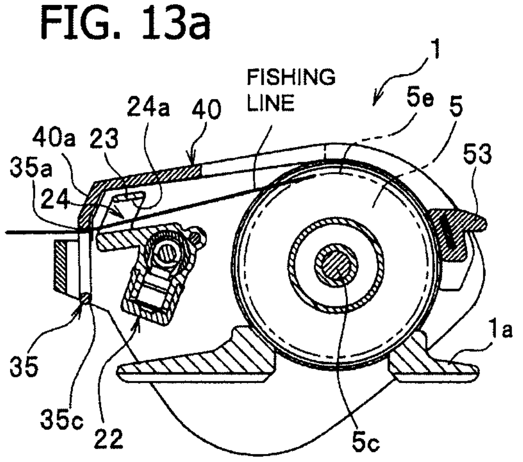
FIG. 13d
FIG. 13c
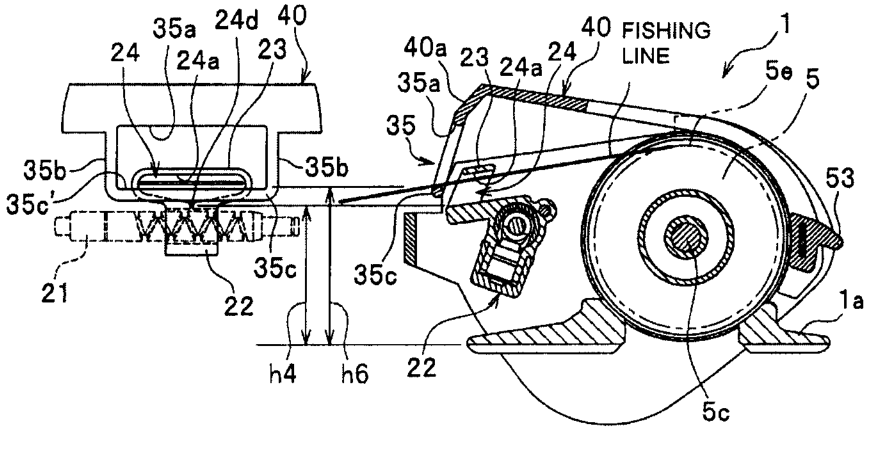

FISHING REEL

CROSS-REFERENCE TO RELATED APPLICATIONS

This application is based upon and claims the benefit of priority from prior Japanese Patent Application No. 2010-218797, filed Sep. 29, 2010 titled "FISHING REEL," the entire contents of which are incorporated herein by reference.

BACKGROUND

The present invention relates to a fishing reel having a level wind mechanism mounted between side plates in from of a spool for winding a fishing line evenly on the spool.

Conventional fishing reels are typically provided with a reel body rotatably supporting a spool which may be switched between clutch-on state (power transmitting state) and clutch-off state (power cutoff state) by operating a clutch lever. The spool is switched to spool-free state (clutch-off state) by operating the clutch lever. In the spool-free state, anglers may perform a casting operation to cast a fishing line (fishing device) to any desired position. Subsequently, in response to a rotation operation of the handle, the spool may automatically return to the clutch-on state.

The level wind mechanism includes a guide body provided with a line guide which can reciprocate in the right and left direction during the rotation operation of the handle, whereby the fishing line held by the line guide can be evenly wound via the line guide on the spool.

It is desired to provide a fishing reel capable of unwinding a fishing line with reduced resistance in order to achieve a greater casting distance and greater falling velocity of a fishing device (shorter period of time to reach the bottom of fishing location). It is also desired to wind a fishing line on a spool evenly to avoid release of fishing line with high resistance or tangled fishing line due to uneven winding of the fishing line.

Japanese Unexamined Patent Publication H01-165329 (the "'329 Publication") discloses a fishing reel designed to meet the above demands. The fishing reel as described in the '329 Publication is provided with a pillar configured to be movable up and down for holding a fishing line. The upward movement of the pillar in unwinding a fishing line can cause the guide resistance to decrease, whereas the downward movement in winding the fishing line can cause the pillar to come into contact with the fishing line for guiding thereby accurately guiding the fishing line to a desired position.

Although the fishing reel of the '329 Publication may decrease guide resistance by moving the pillar up and down in unwinding the fishing line, the fishing reel tends to cause the fishing line to be entangled in unwinding the fishing line, the fishing line unwound from the spool tends to be loose in the vertical direction by centrifugal force, thereby being prone to tangled fishing line.

Additionally, in winding up the fishing line, the fishing line tends to jam at the frame or the edge portion of the guide having V-shape in plan view and/or get stuck with the horizontal edges of the guide.

SUMMARY

One embodiment of the present invention provides a fishing reel designed to smoothly wind and unwind a fishing line.

To address the above drawbacks, a fishing reel in accordance with one aspect of the present invention comprises a spool rotatably supported between a pair of side plates of a reel body; a driving mechanism disposed on one of the pair of side plates; a guide body disposed front of the spool, the guide body being movable in right-and-left-direction in response to rotation operation of a handle shaft of the driving mechanism so as to cause a fishing line to be wound around the spool; a line guide disposed on the guide body; and a pillar; wherein the line guide is provided with a fishing line guide hole formed in an elongated shape viewed from front of the guide body extending in the right-and-left-direction along an axis of the spool は, the guide body; wherein the fishing line guide hole is provided with a lower inner surface including a slope extending downwardly toward a center portion of the lower inner surface; wherein the pillar is disposed movable in a vertical direction in the vicinity in the anterior posterior direction of the line guide and is provided with a fishing line guide portion disposed along the axis; and wherein the pillar is configured to be movable between a first position where the fishing line is held in the center portion of the lower inner surface of the fishing line guide hole and a second position retracted from the first position, the pillar taking the first position by moving downwardly for fishing line winding operation so as to cause the fishing line guide portion to guide the fishing line to the center portion of the lower inner surface of the fishing line guide hole, the pillar taking the second position by moving upwardly for fishing line unwinding operation. The pillar may be a member formed into either a rod-shape, plate shape or casing shape which may push the fishing line downwardly. The fishing line guide portion may be formed in a horizontal flat shape, a flat shape with an angle, curved (concavely or convexly) shape, shape resulting from the combination of several flat members combined with one another, shape resulting from the combination of flat and curved members combined with one another, and any other desired shapes. The slope extending downwardly may include any slope formed in a flat shape with an angle, curved (concavely or convexly) shape, shape resulting from the combination of several flat members combined with one another, shape resulting from the combination of flat and curved members combined with one another, and any other desired shapes.

In accordance with the fishing reel above, the fishing line guide hole formed in the line guide is formed in a rectangular shape viewed from the front of the guide body. The fishing line guide hole extends in the right-and-left-direction along the axis of the spool. As such, the fishing line guide hole is formed in an elongated shape extending along the moving direction of the fishing reel during fishing line unwinding operation such that the fishing line may be unwound from the spool at various positions therein in the right-and-left-direction. Accordingly, during fishing line unwinding operation, the fishing line may travel through the fishing line guide hole at various positions in the right-and-left-direction.

Disposed on the lower inner surface of the fishing line guide hole is a slope extending downwardly towards the center portion of the lower inner surface of the fishing line guide hole. The pillar is provided with the fishing line guide portion extending along the axis of the spool. The downward movement of the pillar to the first position during fishing line winding operation may cause the fishing line guide portion to guide the fishing line into the center portion of the lower inner surface of the fishing line guide hole, thereby holding the fishing line into the center portion of the lower inner surface. Accordingly, during fishing line winding operation, the fishing line is positioned in the center portion of the lower inner surface of the fishing line guide hole such that the movement of the fishing line in the right-and-left-direction is regulated.

In addition, the pillar may be retracted from the first position and move to the second position by moving upwardly during fishing line unwinding operation second position. As such, the fishing line may be movable in the right-and-left-direction in the fishing line guide hole during fishing line unwinding operation by disengaging from the center portion of the lower inner surface of the fishing line guide hole.

One aspect of the present invention is provided with a fishing line guide groove formed at the center portion of the lower inner surface of the fishing line guide hole in the line guide. The pillar may guide the fishing from the center portion of the lower inner surface into the fishing line guide groove.

According to the fishing reel, during fishing line winding operation, the pillar may guide the fishing line into the center portion of the lower inner surface in the line guide. The fishing line may be inserted into the fishing line guide groove formed at the center portion of the lower inner surface. The fishing line is held in the fishing line guide groove and positioned at the center portion of the lower inner surface such that its movement in the right-and-left-direction is regulated.

A fishing reel according to one aspect of the present invention comprises a clutch lever that may be switched between clutch-on state for winding the fishing line onto the spool and a clutch-off state for unwinding the fishing line from the spool, wherein the pillar may move to the first position upon switching the clutch lever to the clutch-on state and to the second position upon switching the clutch lever to the clutch-off state. The operation of switching the clutch lever to the clutch-on state includes an operation of automatically returning to the clutch-on state as a result of the rotation operation of the handle.

According to the fishing reel, the switching operation of the clutch lever to the clutch-on state for winding the fishing line onto the spool may cause the pillar to move to the first position so as to guide and hold the fishing line into the center portion of the lower inner surface of the fishing line guide hole. In addition, the switching operation of the clutch lever to the clutch-off state may cause the pillar to move to the second position, thereby allowing the fishing line to be disengaged from the center portion of the lower inner surface of the fishing line guide hole.

A fishing reel according to one aspect of the present invention comprises a thumb rest disposed on an upper portion of the reel body between the pair of side plates; wherein the thumb rest is configured to be movable in the vertical direction in response to switching operation of the clutch lever, and wherein the pillar is configured to move to the second position upon upward movement of the thumb rest and move to the first position upon downward movement of the thumb rest the reel body. The operation of switching the clutch lever to the clutch-on state includes an operation of automatically returning to the clutch-on state as a result of the rotation operation of the handle.

According to the fishing reel, the thumb rest may move downwardly upon switching of clutch lever to the clutch-on state for winding the fishing line. The downward movement of the thumb rest may cause the pillar to move to the first position so as to guide and hold the fishing line into the center portion of the lower inner surface of the fishing line guide hole. In addition, the thumb rest may move upwardly upon switching of clutch lever to the clutch-off state for unwinding the fishing line. The upward movement of the thumb rest may cause the pillar to move to the second position so as to disengage the fishing line from the center portion of the lower inner surface of the fishing line guide hole.

The thumb rest is configured to move vertically in concert with the vertical movement of the pillar so as not to interfere the movement of the pillar, thereby increasing the travel distance of the pillar in the vertical direction. In addition, the line guide may be formed to have a larger vertical dimension.

A fishing reel according to one aspect of the present invention comprises a clutch lever that may be switched between clutch-on state for winding the fishing line onto the spool and a clutch-off state for unwinding the fishing line from the spool; and a pillar operating portion provided on the reel body separate from the clutch lever. The pillar is configured to move to either the first or second position in response to operation of the pillar operating portion.

According to the fishing reel, the reel body is provided with the pillar operating portion separate from the clutch lever and the pillar is configured to move to the in response to the first position and second positions operation of the pillar operating portion. Accordingly, the operation of the pillar operating portion at the clutch-on state may cause the pillar to move from the first position to the second position so as to disengage the fishing line from the center portion of the lower inner surface of the fishing line guide hole.

In a fishing reel according to one aspect of the present invention, the pillar is disposed between the spool and the line guide.

According to the fishing reel, the pillar which is disposed between the spool and the line guide may hold the fishing line while being unwound from the spool during fishing line unwinding operation. In addition, the pillar may hold the fishing line by apply a tension onto the fishing line during fishing line winding operation.

A fishing reel according to one aspect of the present invention, the pillar is configured to move towards the spool in moving from the first position to the second position and configured to move towards the line guide in moving from the second position to the first position.

According to the fishing reel, the pillar may move from the first position to the second position during fishing line unwinding operation by retracting from the first position and approaching the spool. In addition, the pillar may move from the second position to the first position during fishing line winding operation by departing away from the second position and approaching the line guide.

In a fishing reel according to one aspect of the present invention, the slope is formed to be flat such with an angle between 1° and 30° with respect to a horizontal surface.

According to the fishing reel, the pillar may guide the fishing line via the flat slope to the center portion of the lower inner surface of the line guide. In addition, an angle of the slope with respect to a horizontal surface is set between 1° and 30°, an elongated aperture extending in the horizontal direction favorable for unwinding the fishing line may be ensured.

In a fishing reel according to one aspect of the present invention, the fishing line guide hole is provided with an upper inner surface formed in parallel with the horizontal surface, and wherein a horizontal width of the fishing line guide hole is configured to be larger than a vertical height of the fishing line guide hole such that the fishing line guide hole is formed to be a rectangular shape extending in the right-and-left-direction.

According to the fishing reel, since the fishing line guide hole is provided with the upper inner surface the in parallel with the horizontal surface and the horizontal width of the fishing line guide hole is configured to be larger than the vertical height of the fishing line guide hole such that the fishing line guide hole is formed to be a rectangular shape extending in the right-and-left-direction, it is possible to decrease the unwinding resistance applied to the horizontal direction (right-and-left-direction) during fishing line unwinding operation.

In one aspect, the pillar is supported rotatably both in a winding and unwinding directions.

According to the fishing reel, it is possible to reduce the winding resistance during fishing line winding operation and the unwinding resistance during fishing line unwinding operation.

A fishing reel according to one aspect of the present invention, the pillar is formed into a casing shape surrounding the fishing line.

According to the fishing reel, the pillar formed in a casing shape may hold the fishing line even in the event the fishing line becomes violent in the right-and-left-direction during fishing line unwinding operation.

In a fishing reel according to one aspect of the present invention, the pillar is provided with upper, lower and a pair of side portions; the upper portion is configured to guide the fishing line into the center portion of the lower inner surface of the fishing line guide hole upon movement of the pillar to the first position so as to hold the fishing line in the center portion of the lower inner surface; and the lower portion is configured to guide the fishing line upwardly from the center portion of the lower inner surface of the fishing line guide hole upon movement of the pillar to the second position so as to disengage the fishing line from the center portion of the lower inner surface.

According to the fishing reel, if the pillar is moved to the first position, the upper portion may guide the fishing line to the center portion of the lower inner surface of the fishing line guide hole so that the center portion of the lower inner surface can hold the fishing line. On the other hand, if the pillar is moved to the second position, the lower portion may guide the fishing line upwardly from the center portion of the lower inner surface of the fishing line guide hole so as to disengage the fishing line from the center portion of the lower inner surface.

In a fishing reel according to one aspect of the present invention, the following formulae are satisfied:

$h1 \geq h3 > h2$ and $h4 \geq h2$, during the fishing line winding operation; and $h1 \geq h3$ and $h2 > h3$, during the fishing line unwinding operation, wherein h1 represents a height of a fishing line winding position of the spool, h2 represents a height of a fishing line guide portion of the pillar, h3 represents a height of an upper inner surface of the fishing line guide hole, and h4 represents a height of a center portion of the lower inner surface of the fishing line guide hole each from a lower edge of the reel body.

According to the fishing reel, the height h3 during fishing line winding operation is set not to be equal to or lower than the heights h1; and the height h2 is set to be lower than the height h3. In addition, the height h2 is set to be equal to or lower than the height h4 of the center portion of the fishing line guide hole. In addition, during fishing line unwinding operation, the height h3 is set not to be greater than the height h1 and the height h2 is set to be greater than the height h3.

According to the present invention, the fishing line guide hole is formed in an elongated shape extending along the moving direction of the fishing reel during fishing line unwinding operation (while set to the clutch-off state or to the drag-free state in the clutch-on state) such that the fishing line may be unwound from the spool at various positions therein in the right-and-left-direction. Accordingly, the contact resistance (unwinding resistance) between the inner surface of the fishing line guide hole and the fishing line may be decreased, thereby achieving a smooth unwinding of a fishing line. During fishing line unwinding operation, the pillar moves upwardly from the first position to the second position, the fishing line may be unwound without intervention by the pillar, thereby achieving a smooth unwinding of the fishing line. Thus, undesired deceleration of the unwinding speed of fishing line may be restricted and thereby achieving, for example, a greater casting distance and a greater falling speed of the fishing device.

In addition, the pillar may hold the fishing line in the center portion of the fishing line guide hole during fishing line winding operation when the pillar is positioned at the first position so as to restrict the movement of the fishing line in the right-and-left-direction, whereby the fishing line may be evenly distributed in the right-and-left-direction via the guide body reciprocating in the right-and-left-direction such that the fishing line may be evenly and flatly wound on the spool in order to enable a smooth winding of the fishing line. The elongated fishing line guide hole may restrain violent movement of fishing line by unwinding the fishing line therethrough and thereby preventing the fishing line from being entangled.

Moreover, since the fishing line may be maintained in the fishing line guide groove such that the movement of the fishing line within the guide hole is well regulated during fishing line winding operation, the fishing line may be wound up evenly and flatly on the spool so as to enable a smooth winding of fishing line.

In addition, since the pillar may move to either the first position or second position in response to the switching operation of clutch lever, it is possible to provide a fishing reel which may enable a smooth operation thereof including a smooth fishing line unwinding operation (fishing device casting operation) and smooth fishing line winding operation.

The pillar may be configured to move in concert with the vertical movement of the thumb rest so as to ensure a smooth operation from unwinding operation of the, fishing line (casting of a fishing device) to winding operation of the fishing line. In addition, the thumb rest is configured to move in concert with the pillar so as not to interfere the movement of the pillar, thereby increasing the travel distance of the pillar in the vertical direction. It is also possible to form line guide with a large dimension in the vertical direction (height direction) and thereby to reduce the unwinding resistance (contact resistance) which might occur during fishing line unwinding operation between the inner surface of the fishing line guide hole and the fishing line. Thus, a smooth unwinding of fishing line may be achieved. In addition, the downward movement of the pillar may cause the thumb rest to move downwardly so as to allow anglers to perform a winding operation of a fishing line while palming the fishing reel without any discomfort.

Moreover, a fishing reel according to one embodiment may comprise a pillar operating portion separate from the clutch lever. In that case, the pillar may be moved to the second position by operating the pillar operating portion even during the unwinding operation of fishing reel in the clutch-on and drag-free state so as to reduce the resistance occurred during unwinding of fishing line. Thus, various aspects of the disclosure may achieve smooth unwinding of fishing line.

In case the pillar is disposed between the spool and the line guide, the pillar may hold the fishing line even if it becomes loose (or violent) in the vertical direction by centrifugal force during fishing line unwinding operation As noted above, in one embodiment, the pillar may move in the direction approaching the spool or the line guide. In that case, since the pillar may approach toward the spool when moving from the first position to the second position in upward movement during fishing line unwinding operation, the pillar positioned more adjacent to the spool may hold the fishing line while being unwound from the spool even if the fishing line becomes loose (or violent) in the vertical direction by centrifugal force, thereby achieving a smooth unwinding of the fishing line. On the other hand, since the pillar may approach toward the center portion of the fishing line guide hole when moving from the second position to the first position in upward movement during fishing line unwinding operation, the fishing line may be guided to the center portion of the fishing line guide hole so that the center portion may maintain the fishing line. With this, the fishing line is positioned in the line guide such that the movement thereof in the right-and-left-direction is further restricted, and the fishing line may be evenly distributed in the right-and-left-direction via the guide body reciprocating in the right-and-left-direction, which cause the fishing line to be wound up more evenly and more flatly on the spool. Accordingly, a smooth winding of fishing line may be achieved.

In another aspect, since lower inner surface of the fishing line guide hole is formed to be flat such that the slope angle of the lower inner surface thereof with respect to the horizontal surface may preferably from 1° to 30°, an elongated aperture suitable for unwinding of fishing line may be ensured in the fishing line guide hole, which may result in a smooth unwinding of fishing line. The slope angle with respect to the horizontal surface being from 1° to 30°, the fishing line may be guided to the center portion of the fishing line guide hole as the pillar moves downwardly so as to maintain the fishing line in the center portion. Accordingly, a smooth fishing line winding may be achieved. More particularly, the slope angle may be equal to or more than 5°. The slope angle of 5° may guide the fishing line to the center portion of the fishing line guide hole in case of strong wind or an inclined reel body, thereby maintaining the fishing line in the center portion. Accordingly, a smooth winding of fishing line may be achieved. In another aspect, the slope angle may be equal to or less than 15°, and thereby an aperture of the fishing line guide hole in the height direction may be increased. With this, the guide resistance occurred during fishing line winding operation may be decreased, thereby a smooth fishing line unwinding may be achieved and allowing the thumb rest. Such line guide may be applied to various low-profile fishing reels.

In another aspect, since the upper inner surface of the fishing line guide hole is arranged parallel to the horizontal surface, the unwinding resistance in the horizontal direction (right-and-left-direction) during fishing line unwinding operation may be kept as small as possible, thereby achieving a smooth unwinding of fishing line. In addition, the arrangement parallel in the horizontal direction may restrict violent movements of fishing line during fishing line unwinding operation, thereby achieving a further smoother unwinding of fishing line.

In one embodiment, the rotatably-supported pillar may reduce winding resistance during winding operation and unwinding resistance during unwinding operation, thereby achieving a smooth unwinding and winding of fishing line. In one aspect, the rotatably-supported pillar may apply a preferable tension to a fishing line, whereby the fishing line may be wound on the spool 5 without being tangled even in case of using light-weight fishing device.

In one embodiment, the pillar may be formed in the shape of casing. In that configuration, the pillar may hold the fishing line while being unwound from the spool even if the fishing line becomes loose (or violent) in the right-and-left-direction, thereby achieving a smooth unwinding of the fishing line.

As noted above, in one aspect, the pillar is provided with upper, lower and a pair of side portions, In that configuration, the movement of the pillar to the first position may cause the upper portion to guide the fishing line into the center portion of the lower inner surface of the fishing line guide hole such that the center portion of the lower inner surface holds the fishing line. As such, the fishing line is positioned in the center portion of the lower inner surface, thereby achieving a smooth winding of the fishing line. On the other hand, the movement of the pillar to the second position may cause the lower portion to guide the fishing line upwardly from the center portion of the lower inner surface of the fishing line guide hole such that the fishing line disengages from the center portion of the lower inner surface, which results in unwinding of the fishing line without any contact resistance from the center portion of the lower inner surface. Accordingly, a smooth unwinding of the fishing line is achieved.

As noted above, in one embodiment, the height h3 during fishing line winding operation is set not to be equal to or lower than the heights h1; the height h2 is set to be lower than the height h3; and the height h2 is set to be equal to or lower than the height h4 of the center portion of the fishing line guide hole. In that configuration, the fishing line is surely held in the fishing line guide groove such that the fishing line is positioned in the fishing line guide groove, thereby achieving a smooth winding of the fishing line. In another aspect, during fishing line unwinding operation, the height h3 is set not to be equal to or lower than the heights h1; the height h2 is set to be lower than the height h3; and the height h2 is higher than the height h3. In that configuration, the pillar disposed between the spool and line guide may hold the fishing line while being unwound from the spool even if the fishing line becomes violent in the vertical direction by centrifugal force, thereby achieving a smooth unwinding of the fishing line.

BRIEF DESCRIPTION OF THE DRAWINGS

FIG. 1 (*a*) is a front view of the fishing reel and FIG. 1(*b*) is a top view of the fishing reel.

FIG. 2(*b*) is front view showing the geometry of a line guide and a spool; and FIG. 2(*c*) is a front view showing the particulars of line guide.

FIG. 3(*b*) shows a clutch mechanism.

FIG. 4(*d*) (*f*) show the geometry of various components of the fishing reel in unwinding a fishing line.

FIG. 5(*d*) is a top view showing the horizontal movement of a fishing line in unwinding the fishing line.

FIG. 6(*a*) is a top view; and FIG. 6(*b*) shows a pillar operating portion.

FIG. 7(*a*) is a front view of the fishing reel and FIG. 7(*b*) is a top view of the fishing reel.

FIG. 8(*c*) and (*d*) show the geometry of various components of the fishing reel in unwinding a fishing line.

FIG. 9(*b*) is a cross section view along A-A line of FIG. 9(*a*).

FIG. 10(*a*) is a front view of the fishing reel and FIG. 10(*b*) is a top view of the fishing reel.

FIG. 11(*c*) and (*d*) show the geometry of various components of the fishing reel in unwinding a fishing line.

FIG. 12(*a*) is a front view of the fishing reel and FIG. 12(*b*) is a top view of the fishing reel.

FIG. 13(*a*) and (*b*) show the geometry of various components of the fishing reel in winding a fishing line; and FIG. 13(*c*) and (*d*) show the geometry of various components of the fishing reel in unwinding a fishing line.

DETAILED DESCRIPTION OF THE PREFERRED EMBODIMENTS

With reference to the appended drawings, a fishing reel according to various embodiments of the invention will be described. Any references made herein to such relative terms as forward and rearward, front and back, right and left, top and bottom, upper and lower, or the like, are used in relation to the directions shown in FIG. 1. The same or similar numerals are used to designate the same or similar elements, with detailed descriptions thereof being omitted for simplicity.

Figure 1A:
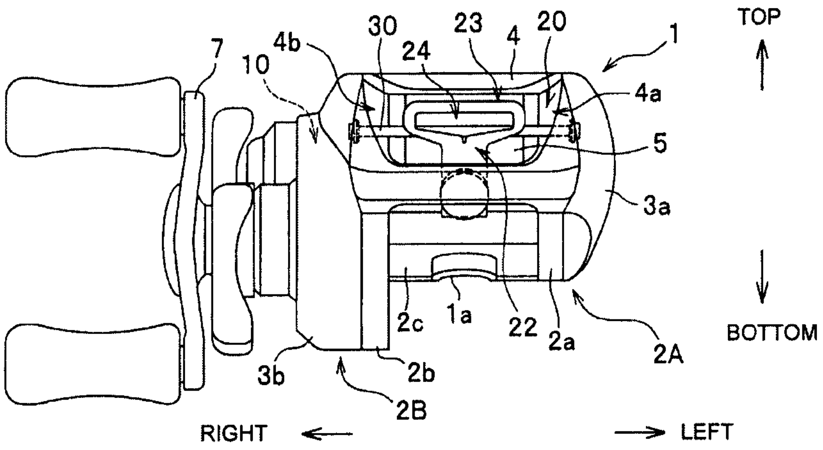
FIG. 1 shows a fishing reel in accordance with one embodiment.
Figure 1B:
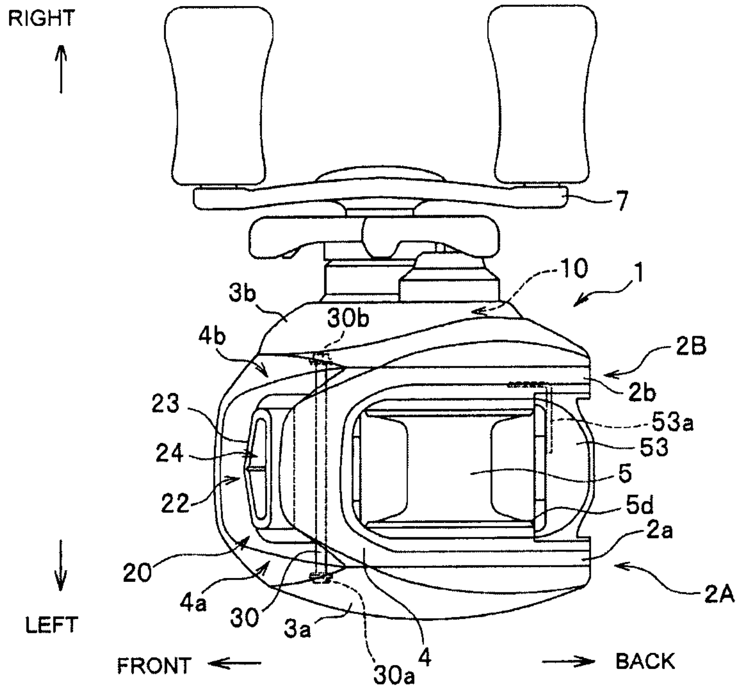
Figure 2A:
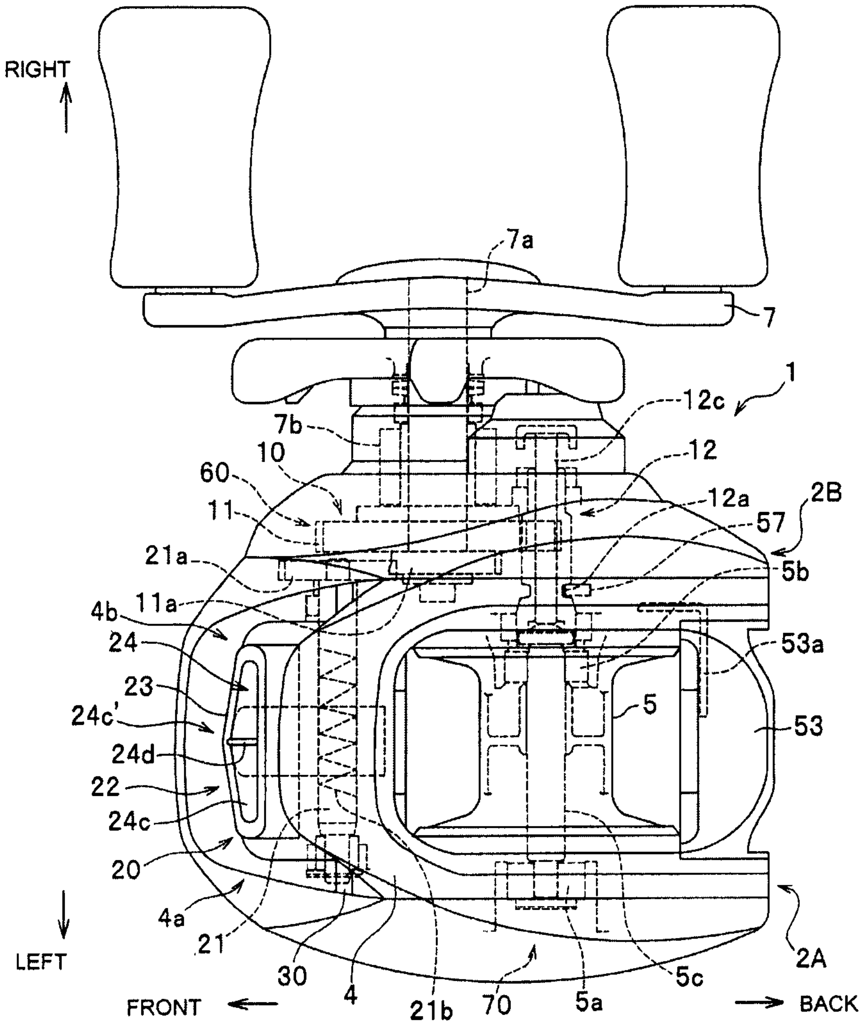
FIG. 2(*a*) is a top view showing and internal structure of a reel body.
Figure 2B:
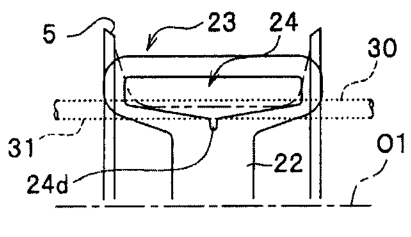
Figure 2C:
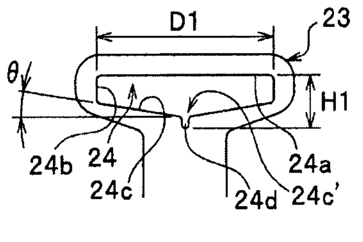
Figure 3A:
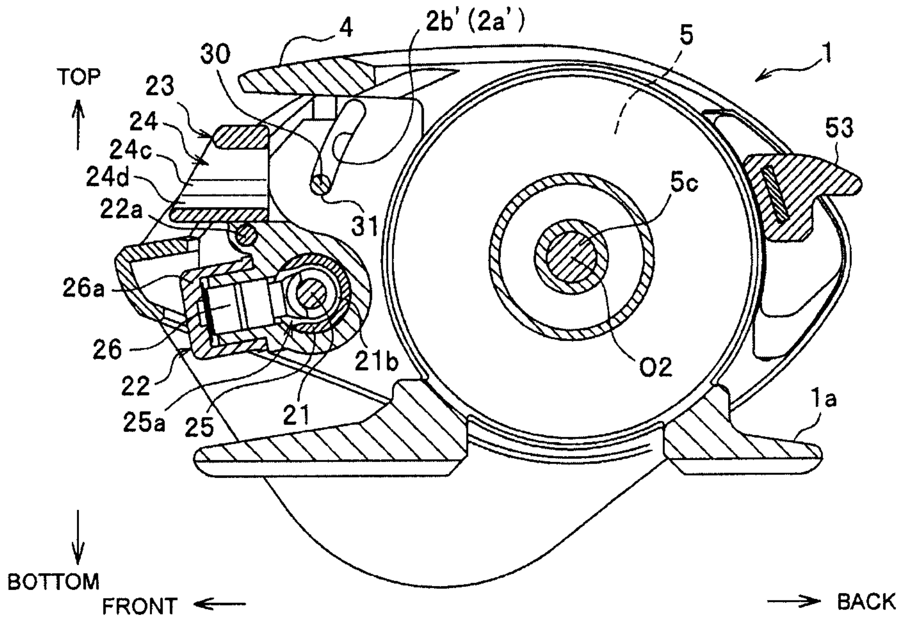
FIG. 3(*a*) is a longitudinal sectional view showing the main portion of a reel body.
Figure 3B:
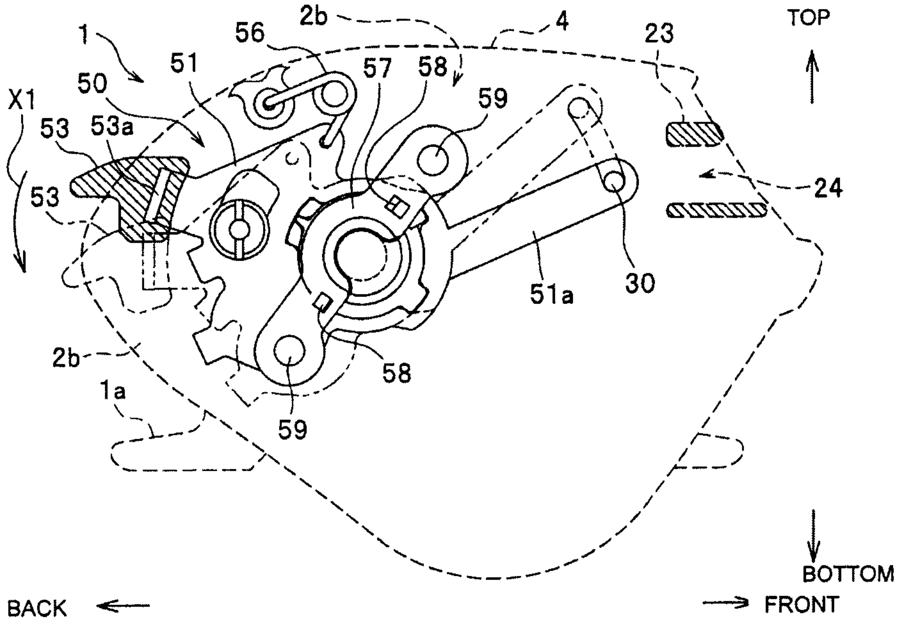
Figure 4B:
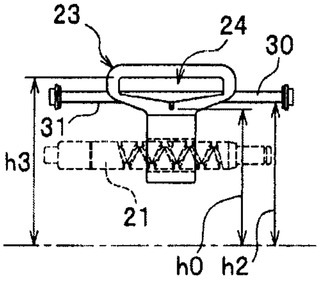
FIG. 4(*a*)-(*c*) show the geometry of various components of the fishing reel in winding a fishing line.
Figure 4A:
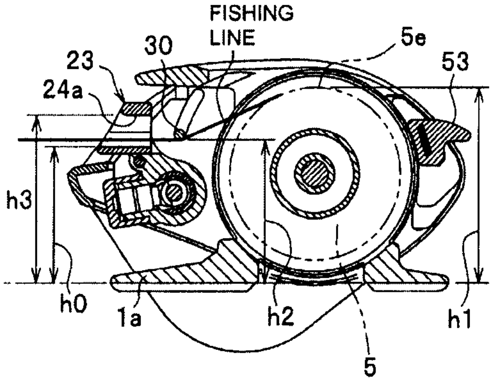
Figure 4C:
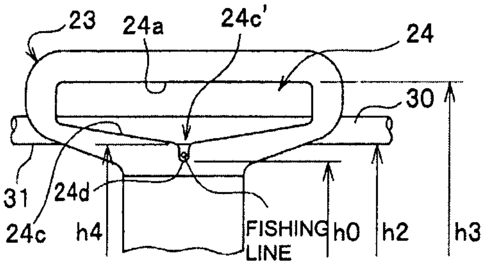
Figure 4E:
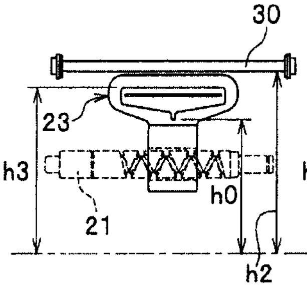
Figure 4D:
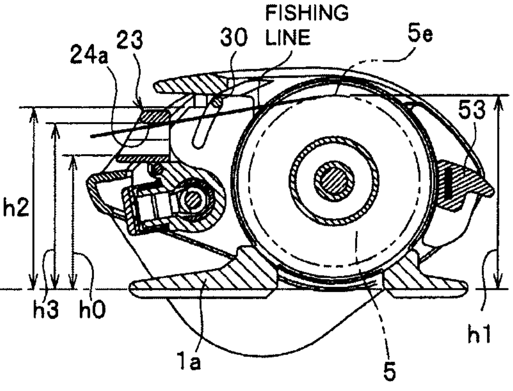
Figure 4F:
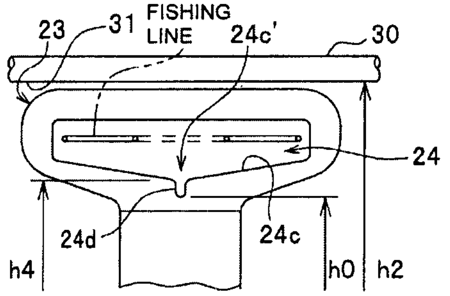
Figure 5A:
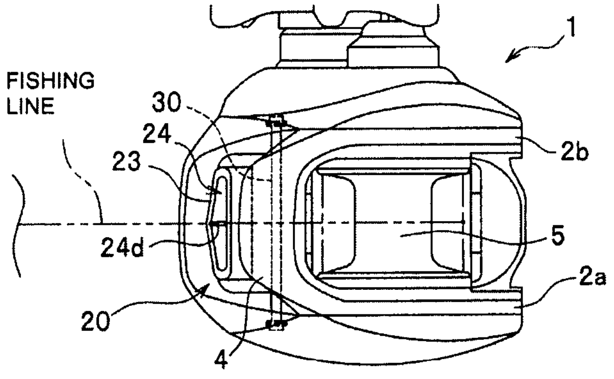
FIG. 5(*a*)-(*c*) are top views showing the position of a line guide in winding a fishing line.
Figure 5B:
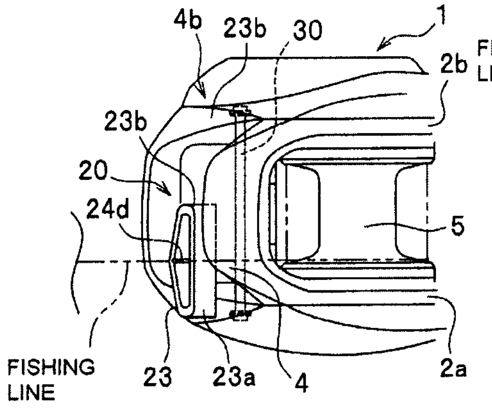
Figure 5C:
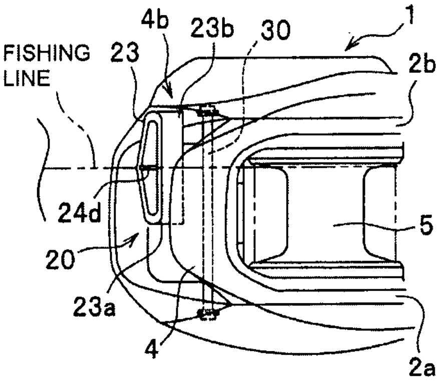
Figure 5D:
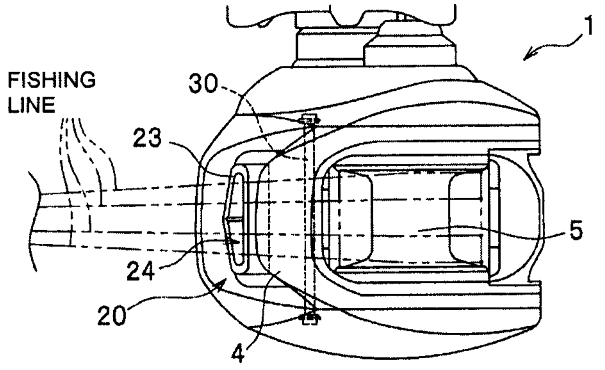

As shown in FIG. 1, reel body 1 of the fishing reel is provided with a pair of side plates 2*a* and 2*b* configured to rotatably support spool 5 on which a fishing line is wound. The reel body 1 includes, as shown in FIG. 2(*a*), driving mechanism 10 mounted on the side plate 2B; guide body 22 disposed in front of the spool 5, the guide body 22 being configured to reciprocate in the left and right directions in response to the rotation operation of the handle shaft 7*a* of the driving mechanism 10 in order to wind up the fishing line evenly on the spool 5; and line guide 23 mounted on the guide body 22. Disposed in rear of and in the vicinity of the line guide 23 is pillar 30 provided with fishing line guide member 31 (shown in FIG. 2(*b*)) extending along the axis of spool 5. The “side plates” of the reel body 1 is, as shown in FIG. 1(*b*), may be disposed at both axial ends of spool 5. In one embodiment, the side plates may comprise a frame body including left and right bodies 2*a* and 2*b* configured to support various components; and left and right outer plates (cover plates) 3*a* and 3*b* attached to the corresponding left and right bodies 2*a* and 2*b*. Each defined between the left body 2*a* and left plate 3*a* as well as right body 2*b* and right outer plate 3*b* is an internal space which houses, as shown in FIG. 2(*a*), driving mechanism 10, clutch mechanism 50 (as shown in FIG. 3(*b*)), back lash preventing mechanism 70 (FIG. 2(*a*)) and other components. It should be appreciated that the shape and material of left and right bodies 2*a* and 2*b* and outer plates 3*a* and 3*b* may vary depending on various factors. It also should be appreciated that the method and position of mounting left and right bodies 2*a* and 2*b* and outer plates 3*a* and 3*b* may vary depending on particular configurations of the reel body 1.

As shown in FIG. 1(*a*), the left and right bodies 2*a* and 2*b* are combined with one another via a plurality of supporting columns. The plurality of columns include lower column 2*c* provided with rod mounting leg 1*a* which is mounted on a reel sheet (not shown) of a fishing rod. In addition, as shown in FIG. 2(*a*), spool shaft 5*c* is rotatably supported between the left and right bodies 2*a* and 2*b* via bearings 5*a* and 5*b*. Spool 5 is attached to the spool shaft 5*c*. Spool 5 is configured to rotate in response to the rotation operation of handle 7. The handle 7 is attached to one end portion of handle shaft 7*a* projecting from the outer plate 3*b* and equipped with backstop mechanism 7*b* (roller-type one way clutch). The backstop mechanism 7*b* intervenes between the handle 7 and the outer plate 3*b* so as to allow the handle 7 to rotate in the fishing line winding direction only. It should be appreciated that bearings 5*a* and 5*b* which rotatably supports the spool shaft 5*c* may be disposed either between the left and right bodies 2*a* and 2*b* or between the outer plates 3*a* and 3*b*.

Disposed between the right frame 2*b* and the outer plate 3*b* are driving mechanism 10 which may transmit the rotation of the handle 7 to the spool shaft 5*c* and spiral shaft 21 of level wind mechanism 20 as described below, clutch mechanism 50 for switching the transmission of driving force (as shown in FIG. 3(*b*)), and drag mechanism 60 for applying an drag force onto the spool 5 as the fishing line is unwound from the spool 5.

The driving mechanism 10 is provided with, as known in the art, driving gear 11 which is rotatably supported by the handle shaft 7*a* and pinion 12 meshed with the driving gear 11. The pinion 12 is disposed coaxial with the spool shaft 5*c* so as to be translated along pinion shaft 12*c*. On the outer periphery of the pinion 12, annular groove 12*a* is formed with which yoke 57 (as shown in FIG. 3(*b*)) of the clutch mechanism 50 engages so as to translate the pinion 12 in the axial direction. As such, the pinion 12 is caused to engage with or disengage from the spool shaft 5*c* as a result of its axial movement thereof, thereby switching between the power transmission state (clutch-on state) and power cutoff state (clutch-off state).

The level wind mechanism 20 is disposed in front of the spool 5 and between the pair of side plates 2*a* and 2*b* of the reel body 1. The level wind mechanism 20 includes spiral shaft 21 rotatably driven via the driving mechanism 10. The level wind mechanism 20 also includes guide body 22 attached to the spiral shaft 21 so as to reciprocate in the right and left direction. The spiral shaft 21 is rotatably supported with the pair of side plates 2*a* and 2*b* and may be driven by the driving mechanism 10. Interlocking gear 21*a* is attached at the end portion of the spiral shaft 21. The interlocking gear 21*a* is meshed with gear 11*a* located adjacent to the driving gear 11 of the handle shaft 7*a*. With this, in response to the rotation operation of the handle 7, the rotation of the handle shaft 7*a* is transmitted through the gear 11*a* and interlocking gear 21*a* to the spiral shaft 21, thereby rotatably driving the spiral shaft 21.

As shown FIG. 3(*a*), slidable member 26 of the guide body 22 engages with spiral groove 21*b* which is formed on the outer periphery of the spiral shaft 21. The spiral shaft 21 is housed in body 25 which bridges the pair of side plates 2*a* and 2*b*. Formed on the body 25 is aperture 25*a* having C-shaped cross section and extending in the axial direction. The spiral groove 21*b* is partially exposed through the aperture 25*a*.

The guide body 22 is made of resin and supported by guide shaft 22*a* disposed in parallel with the spiral shaft 21 between the pair of side plates 2*a* and 2*b*. The lower portion of the guide body 22 surrounds the body 25 such that the rotation of the guide body 22 is arrested by the body 25. As described above, the slidable member 26 is disposed at the lower portion of the guide body 22. The slidable member 26 is configured to engage with the spiral groove 21*b* via the aperture 25*a* of the body 25. The slidable member 26 is fixed to the guide body 22 via hexagon cap nut 26*a*. As such, in response to the rotary drive of the spiral shaft 21 via the interlocking gear 21*a* may cause the guide body 22 to reciprocate along the guide shaft 22*a* together with the slidable member 26 engaging with the spiral groove 21*b*.

The upper portion of the guide body 22 is provided with line guide 23 with fishing line guide hole 24 for guiding a fishing line. As shown in FIG. 2(*b*), the fishing line guide hole 24 is formed in an elongated shape, as viewed from front, extending in the horizontal direction along the axis O1 of the spool 5. As shown in FIG. 2(*c*), the fishing line guide hole 24 is formed such that the horizontal width D1 thereof is greater than the vertical height h1 (as defined as the maximum height at the center of the fishing line insertion hole 24). The upper inner surface 24*a* of the fishing line guide hole 24 is formed parallel to the horizontal surface, and the side inner surfaces 24*b*, 24*b* each connected to the upper inner surface 24*a* are formed parallel to the vertical surface. Each of the lower inner surfaces 24*c* each connected to the corresponding side inner surfaces 24*b*, 24*b* includes a pair of flat slopes extending downwardly toward the center portion 24*c*' formed on the lower inner surface 24*c* at the center thereof.

As shown in FIG. 2(*c*), the slope angle θ of the lower inner surface 24*c* with respect to the horizontal surface is preferably from 1° to 30°, and more preferably from 5° to 15°. The lower inner surface 24*c* is also formed flat along the anterior posterior direction. The corners between the upper inner surface 24*a* and each of the side inner surfaces 24*b*, 24*b* as well as between each of the side inner surfaces 24*b*, 24*b* and the lower inner surface 24*c* are rounded off. In one aspect, the lower inner surface 24*c* may be formed in convexly or concavely curved shape in the right-and-left-direction, shape resulting from the combination of several flat members combined with one another in the right-and-left-direction, shape resulting from the combination of flat and curved members combined with one another in the right-and-left-direction, and any other desired shapes. The lower inner surface 24*c* may be formed flat in the anterior posterior direction so as to guide a fishing line to the center portion 24*c*' more smoothly.

In one embodiment, fishing line guide groove 24*d* is formed at the center portion of the lower inner surface 24*c* (center portion 24*c*') for holding a fishing line during winding operation. The fishing line guide groove 24*d* is formed by downwardly cutting off the lower inner surface 24*c* at the center portion so as to extend in the anterior posterior direction, as shown in FIG. 3(*a*). As shown in FIGS. 4(*a*)-(*c*), a fishing line may be fitted into the fishing line guide groove 24*d* by guiding the fishing line within the fishing line guide hole 24 along the lower inner surface 24*c* (as shown in FIG. 2(*b*)) to the center portion 24*c*' with the pillar 30 pushed down in response to the operation of clutch lever 53 as described hereinafter.

As shown in FIGS. 5(*b*) and (*c*), the thus configured line guide 23 with the fishing line guide hole 24 has such an elongated shape extending in the right-and-left-direction and may reciprocate along the guide shaft 22*a* in the right-and-left-direction in response to the rotation operation of the handle 7 during winding up a fishing line between the left end position where the left side of the line guide 23 comes into contact with the left body 2*a* and the right end position where the right side of the line guide 23 comes into contact with the right body 2*b*. In order to allow such movement of the line guide 23, a pair of cutouts 4*a*-4*b* are formed at the front portion of the thumb rest 4 of the reel body 1, as shown in FIG. 1(*a*) (*b*).

As shown in FIGS. 1(*a*)-(*b*) and 3(*a*), pillar 30 is formed in a cylindrical rod-shape and disposed between the spool 5 and the line guide 23 in rear of and in the vicinity of the line guide 23 so as to be vertically movable. As shown in FIG. 3(*b*), the pillar 30 is supported at its one end by arm 51*a* integral with clutch driving member 51 of the clutch mechanism 50. As described hereinafter, the pillar 30 is disposed to be vertically movable along curved elongated grooves 2*a*' and 2*b*' (as shown in FIG. 3(*a*)) formed on the left and right bodies 2*a* and 2*b* in response to drive of the clutch driving member 51. As shown in FIG. 2(*b*), the pillar 30 is provided with fishing line guide member 31 (i.e., the lower outer periphery thereof, as shown in FIG. 3(*a*)) extending along the axis O1 of the spool 5 so as to push down a fishing line between the spool 5 and the line guide 23 with the fishing line guide member 31. It should be appreciated that the shape of the pillar 30 is not limited to the cylindrical rod-shape. For example, the pillar 30 may be formed in flat shape equipped with fishing line guide member 31 for pushing down fishing line. In one aspect, the fishing line guide member 31 may be formed in flat or curved (concavely or convexly) shape so as to be inclined in the right-and-left-direction, shape resulting from the combination of several flat members combined with one another in the right-and-left-direction, shape resulting from the combination of flat and curved members combined with one another in the right-and-left-direction, and any other desired shapes.

In the clutch-on state (in winding up fishing line) where the fishing line is winded up on the spool 5, the clutch mechanism 50 causes the pillar 30 to move downwardly to take the first position where the fishing line inserted into the fishing line guide hole 24 is guided to the center portion 24*c*' so as to be held at the center portion 24*c*' (fishing line guide groove 24*d*). On the other hand, in the clutch-off state (in unwinding fishing line) where the fishing line is unwound from the spool 5, the pillar 30 may move upwardly from the first position to the second position where the fishing line is disengaged from the enter portion 24*c*'.

In one aspect, the pillar 30 is configured to be vertically movable in the region above the horizontal surface (not shown) passing through the axis O2 of the spool shaft 5*c* as shown in FIG. 3(*a*), whereby the pillar 30 may approach toward the spool 5 located on the rear side when moving from the first position to the second position in upward movement, whereas the pillar 30 may approach toward the line guide 23 located on the front side when moving from the second position to the first position in downward movement.

In one aspect, the pillar 30 may be pivotally supported around its axis by the arm 51*a* of the clutch driving member 51 via the bearings 30*a* and 30*b* (as shown FIG. 1(*b*)), whereby decreasing the winding resistance that may occur in winding up the fishing line and unwinding resistance that may occur in unwinding the fishing line.

In one aspect, the clutch mechanism 50 may include clutch driving member 51 supported rotatably along the right frame 2*b*, and clutch lever 53 for driving the clutch driving member 51, as shown in FIG. 3(*b*).

The clutch driving member 51 may be supported by the right frame 2*b* as known in the art, and is configured to be switched by the switching spring 56 between power transmission state (clutch-on state) as represented in solid line and power cutoff state (clutch-off state) as represented in two-dot chain line in FIG. 3(*b*). In one aspect, formed on the surface of the clutch driving member 51 is a pair of cam surfaces 58, 58 engageable with the yoke 57 fitted into the annular groove 12*a* of the pinion 12 (as shown in FIG. 2(*a*)). In one aspect, the forwardly-extending arm 51*a* is integrally formed on the front portion of the clutch driving member 51. As described above, one end of the pillar 30 is supported at the tip end of the arm 51*a*.

In one aspect, the leading edge portion of the yoke 57 may be supported by supporting pins 59, 59 projecting from the right frame 2*b*. The yoke 57 may be constantly biased toward the clutch driving member 51 by spring members (not shown) mounted on each of the supporting pins 59, 59. FIG. 3(*b*) shows the yoke 57 biased by the spring members toward the clutch driving member 51, wherein the pinion 12 engages with the engagement portion formed at the edge of the spool shaft 5*c* to become the clutch-on state.

In one aspect, the rear edge of the clutch driving member 51 is connected via supporting member 53*a* to the clutch lever 53. As represented by the reference arrow X1 in FIG. 3(*b*), the clutch driving member 51 is rotated in counter-clockwise direction in response to a push down operation of the clutch lever 53, which causes the pinion 12 via the yoke 57 to disengage from the end portion of the spool shaft 5*c* (to switch to the clutch-off state). The disengaged status of the pinion 12 may be maintained by the switching spring 56. In addition, as a result of the rotation of the clutch driving member 51 in counter-clockwise direction in response to the push down operation of the clutch lever 53, the tip edge of the arm 51*a* move upwardly so as to cause the pillar 30 to move upwardly to the second position. That is, by operating the clutch lever 53, the clutch driving member 51 may be positioned either in the clutch-on state (i.e., at fishing line winding position) or in the clutch-off state (i.e., at fishing line unwinding position). In concert with the position of the clutch driving member 51, the pillar 30 is switched between the first position and the second position.

Next, the relative heights of the spool 5, pillar 30 and fishing line guide hole 24 will be described with reference to FIG. 4. FIGS. 4(*a*)-4(*c*) show the geometry of the spool 5, pillar 30 and fishing line guide hole 24 during fishing line winding operation when the clutch mechanism 50 is switched to the power transmission state (clutch-on state) and thereby the pillar 30 is maintained a the first position.

In one aspect, the height h1 of fishing line winding position 5*e* of the spool 5 from the lower surface of the rod mounting leg 1*a* of the reel body 1, the height h2 of the fishing line guide member 31 of the pillar 30 from the same surface, the height h3 of the upper inner surface 24*a* of the fishing line guide hole 24 from the same surface, and the height h4 of the center portion 24*c*' of the fishing line guide hole 24 from the same surface may be determined to satisfy, during fishing line winding operation, the following formulae:

$$h1 \geq h3 > h2 \quad (1)$$

$$h4 \geq h2 \quad (2)$$

The fishing line winding position may correspond to the outer surface of the spool 5 on which a predetermined amount of fishing line is wound. In another aspect, the fishing line winding position may be deemed as the position the radial distance of which from the axis of spool 5 corresponds to 98% of the maximum outer radius of the spool 5 (i.e., the outer radius of the flange 5*d*).

Thus, the height h3 during fishing line winding operation is set not to be equal to or lower than the heights h1; and the height h2 is set to be lower than the height h3. In addition, the height h2 is set to be equal to or lower than the height h4 of the center portion 24*c*' of the fishing line guide hole 24. With this, when the pillar 30 is moved to the first position, the fishing line guide member 31 is positioned at a level lower than the upper inner surface 24*a* of the fishing line guide hole 24 as well as at a level equal to in height or lower than the center portion 24*c*'.

Accordingly, upon switching from the clutch-off state to the clutch-on state in response to the operation of the clutch lever 53 and/or the handle 7, the fishing line is pushed down by the fishing line guide member 31 as the pillar 30 moves from the second position to the first position, which causes the fishing line to move along the lower inner surface 24*c* of the fishing line guide hole 24 toward the center portion 24*c*'. Then, the fishing line is guided to fit into the fishing line guide groove 24*d* when the pillar 30 is moved to the first position, whereby the fishing line is held in the fishing line guide groove 24*d*.

While the fishing line is thus held in the fishing line guide groove 24*d*, the fishing line is applied with tension from the fishing line guide member 31 of the pillar 30. Accordingly, the fishing line may be wound in a controlled manner by holding the fishing line using the pillar 30, thereby preventing the fishing line from disengaging from the fishing line guide groove 24*d*.

In one aspect, during fishing line winding operation, the height h0 of the bottom of the fishing line guide groove 24*d* from the lower surface of the rod mounting leg 1*a* of the reel body 1 may be set to satisfy the following formula:

$$h4 \geq h2 > h0 \quad (3)$$

Thus, the height h2 is set to be equal to or lower than the height h4 and the height h0 is set to be lower than the height h2. With this, when the pillar 30 is moved to the first position, the fishing line guide member 31 is positioned at a level equal to in height or lower than the center portion 24*c*' as well as at a level higher than the bottom of the fishing line guide groove 24*d*. Accordingly, the fishing line is ensured to be maintained in the fishing line guide groove 24*d*, thereby further preventing the fishing line from disengaging from the fishing line guide groove 24*d*. In one embodiment where a more light-weight fishing device is used, the heights h0 and h2 may be determined according to the formula of h2≤h0 in order to apply greater tension to the fishing line.

FIGS. 4(*d*)-4(*f*) show the geometry of various components during fishing line unwinding operation when the clutch mechanism 50 is switched to the power cutoff state (clutch-off state) such that the pillar 30 is maintained at the second position. The heights h1-h3 may be set according to the following formulae:

$$h1 \geq h3 \quad (4)$$

$$h2 > h3 \quad (5)$$

Thus, during fishing line unwinding operation, the height h3 is set not to be greater than the height h1 and the height h2 is set to be greater than the height h3. With this, when the pillar 30 is moved to the second position, the fishing line guide member 31 is positioned at a level equal to or lower than the fishing line winding position 5*e* of the spool 5 as well as at a level higher than the upper inner surface 24*a* of the fishing line guide hole 24.

Accordingly, upon switching from the clutch-on state to the clutch-off state in response to the operation of the clutch lever 53, the fishing line is disengaged from the fishing line guide groove 24*d* to move to the elongated space formed on the upper portion of fishing line guide hole 24 as the pillar 30 moves from the first position to the second position, resulting in smooth unwinding of the fishing reel. In addition, upon the movement of the pillar 30 to the second position, according to the formulae (4) and (5), the fishing line bridges the upper inner surface 24*a* of the fishing line guide hole 24 and fishing line winding position 5*e* of the spool 5 and the fishing line guide member 31 of the pillar 30 is located above the fishing line apart therefrom. Accordingly, the pillar 30 is not in contact with the fishing line while being unwound from the spool 5, thereby enabling a smooth unwinding of the fishing line.

In one aspect, during fishing line winding operation, the line guide 23 may reciprocate in the right-and-left-direction in response to the rotation operation of the handle 7, as shown in FIGS. 5(*a*)-5(*c*), whereby the fishing line inserted in the fishing line guide groove 24*d* of the line guide 23 may be evenly wound up on the spool 5 via the pillar 30.

In one embodiment, the fishing line guide groove 24*d* of the line guide 23 is arranged to reciprocate between the right and left ends of the of the spool 5 so as to guide the fishing line to the spool 5. As such, the line guide 23 may move until the left side portion 23*a* and right side portion 23*b* of the line guide 23 come into contact with the corresponding left and right bodies 2*a* and 2*b*, as shown in FIGS. 5(*b*) and (*c*) where the left and right side portions 23*a* and 23*b* may be received by the corresponding cutouts 4*a*-4*b* formed on each of the front edge portion of the thumb rest 4 of the reel body 1. With this, the elongated line guide 23 may reciprocate in the right-and-left-direction so as to allow the fishing line guide groove 24*d* to reciprocate between the left and right edges of the spool 5.

In one aspect, during fishing line unwinding operation, the fishing line may be released within the range defined by the fishing line guide hole 24 of the line guide 23, as shown in FIG. 5(*d*). FIG. 5(*d*) shows the line guide 23 which is located at around the horizontal center. The line guide 23 may be located at the leftmost position as shown in FIG. 5(*b*) and at the rightmost position as shown in FIG. 5(*c*) where approximately half of the fishing line guide hole 24 of the line guide 23 may face the barrel portion of the spool 5 on which the fishing line is wound, thereby enabling a smooth unwinding of the fishing line.

As described above, the fishing reel according to various embodiments includes the fishing line guide hole 24 which is formed into an elongated shape extending in the right-and-left-direction. Accordingly, during unwinding fishing line (in the clutch-off state or in the clutch-on and drag-free state), the fishing line may be unwound from the spool 5 through the fishing line guide hole 24 at various positions therein in the right-and-left-direction so that the contact resistance (unwinding resistance) between the inner surface of the fishing line guide hole 24 and the fishing line can decrease to enable a smooth unwinding of the fishing line. In various embodiments, the pillar 30 is positioned at the first position during fishing line unwinding operation by moving upwardly from the first position to the second position so that the fishing line may be unwound without being interfered by the pillar 30, thereby achieving a smooth unwinding of the fishing line. Thus, undesired deceleration of the unwinding speed of fishing line may be restricted and thereby achieving, for example, a greater casting distance and a greater falling speed of the fishing device.

In addition, the pillar 30 may hold the fishing line in the center portion 24*c*' of the fishing line guide hole 24 during fishing line winding operation when the pillar 30 is positioned at the first position so as to restrict the movement of the fishing line in the right-and-left-direction, whereby the fishing line may be evenly distributed in the right-and-left-direction via the guide body 22 reciprocating in the right-and-left-direction such that the fishing line may be evenly and flatly wound on the spool 5 in order to enable a smooth winding of the fishing line. The elongated fishing line guide hole 24 may restrain violent movement of fishing line by unwinding the fishing line therethrough and thereby preventing the fishing line from being entangled.

Moreover, since the fishing line may be maintained in the fishing line guide groove 24*d* such that the movement of the fishing line within the guide hole 24 is well regulated during fishing line winding operation, the fishing line may be wound up evenly and flatly on the spool 5 so as to enable a smooth winding of fishing line.

In another aspect, since the pillar 30 may move to either the first position or second position in response to the switching operation of clutch lever 53, it is possible to provide a fishing reel which may enable a smooth operation thereof including a smooth fishing line unwinding operation (fishing device casting operation) and smooth fishing line winding operation.

In another aspect, the pillar 30 may be arranged between the spool 5 and the line guide 23 so as to hold the fishing line even if it becomes loose (or violent) in the vertical direction by centrifugal force during fishing line unwinding operation.

In another aspect, since the pillar 30 may approach toward the spool 5 when moving from the first position to the second position in upward movement during fishing line unwinding operation, the pillar 30 positioned more adjacent to the spool 5 may hold the fishing line while being unwound from the spool 5 even if the fishing line becomes loose (or violent) in the vertical direction by centrifugal force, thereby achieving a smooth unwinding of the fishing line. On the other hand, since the pillar 30 may approach toward the center portion 24*c*' of the fishing line guide hole 24 when moving from the second position to the first position in upward movement during fishing line unwinding operation, the fishing line may be guided to the center portion 24*c*' of the fishing line guide hole 24 so that the center portion 24*c*' may maintain the fishing line. With this, the fishing line is positioned in the line guide 23 (fishing line guide groove 24*d*) such that the movement thereof in the right-and-left-direction is further restricted, and the fishing line may be evenly distributed in the right-and-left-direction via the guide body 22 reciprocating in the right-and-left-direction, which cause the fishing line to be wound up more evenly and more flatly on the spool 5. Accordingly, a smooth winding of fishing line may be achieved.

In another aspect, since lower inner surface 24*c* of the fishing line guide hole 24 is formed to be flat such that the slope angle of the lower inner surface thereof with respect to the horizontal surface may preferably from 1° to 30°, an elongated aperture suitable for unwinding of fishing line may be ensured in the fishing line guide hole 24, which may result in a smooth unwinding of fishing line. The slope angle with respect to the horizontal surface being from 1° to 30°, the fishing line may be guided to the center portion 24*c*' of the fishing line guide hole 24 as the pillar 30 moves downwardly so as to maintain the fishing line in the center portion 24*c*'. Accordingly, a smooth fishing line winding may be achieved. More particularly, the slope angle may be equal to or more than 5°. The slope angle of 5° may guide the fishing line to the center portion 24*c*' of the fishing line guide hole 24 in case of strong wind or an inclined reel body 1, thereby maintaining the fishing line in the center portion 24*c*'. Accordingly, a smooth winding of fishing line may be achieved. In another aspect, the slope angle may be equal to or less than 15°, and thereby an aperture of the fishing line guide hole 24 in the height direction may be increased. With this, the guide resistance occurred during fishing line winding operation may be decreased, thereby a smooth fishing line unwinding may be achieved and allowing the thumb rest 4. Such line guide 23 may be applied to various low-profile fishing reels.

In another aspect, since the upper inner surface 24*a* of the fishing line guide hole 24 is arranged parallel to the horizontal surface, the unwinding resistance in the horizontal direction (right-and-left-direction) during fishing line unwinding operation may be kept as small as possible, thereby achieving a smooth unwinding of fishing line. In addition, the arrangement parallel in the horizontal direction may restrict violent movements of fishing line during fishing line unwinding operation, thereby achieving a further smoother unwinding of fishing line.

In one embodiment, the rotatably-supported pillar 30 may reduce winding resistance during winding operation and unwinding resistance during unwinding operation, thereby achieving a smooth unwinding and winding of fishing line. In one aspect, the rotatably-supported pillar 30 may apply a preferable tension to a fishing line, whereby the fishing line may be wound on the spool 5 without being tangled even in case of using light-weight fishing device.

Additionally or alternatively, since a fishing reel according to one aspect of the disclosure is configured to satisfy the formulae (1) and (2), the fishing line may be surely maintained inside the fishing line guide groove 24*d* during fishing line winding operation and may be positioned in the fishing line guide groove 24*d* to ensure a smooth winding of fishing line. In another aspect, a fishing reel is configured to satisfy the formulae (4) and (5) so as to restrict violent movement of the fishing line which otherwise may be loose in the vertical direction due to centrifugal force applied during fishing line unwinding operation. Thus, various aspects of the disclosure may achieve a smooth winding of fishing line.

Now, with reference to FIGS. 6(*a*) and (*b*), another embodiment of a fishing reel will be described. In this embodiment, reel body 1 of the fishing reel may be provided with pillar operating portion 300A separate from clutch lever 53.

Figure 6A:
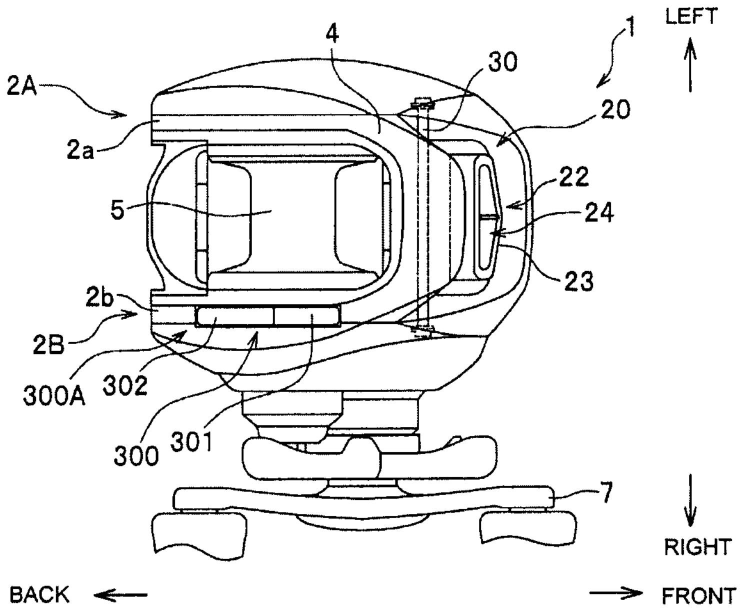
FIG. 6 shows a fishing reel in accordance with another embodiment.
Figure 6B:
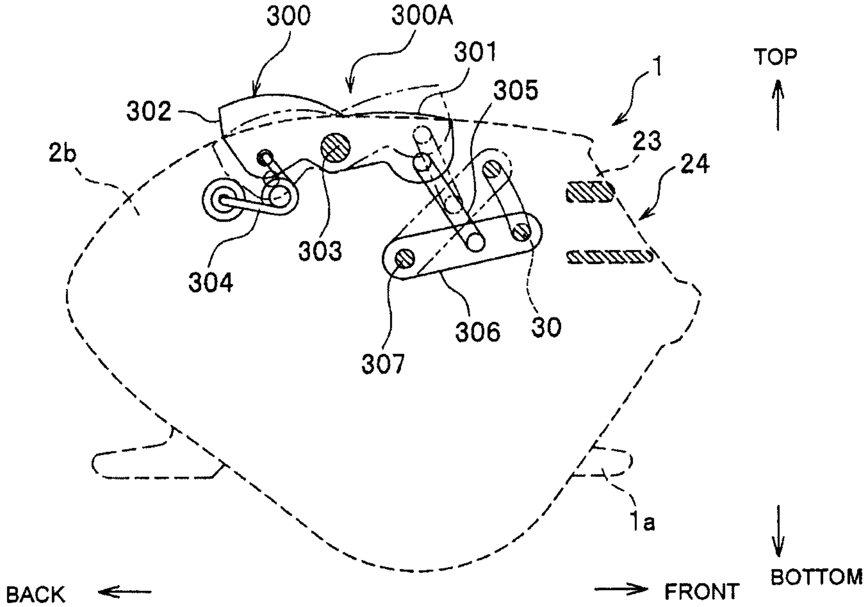

As shown in FIG. 6(*b*), the pillar operating portion 300A may include, pillar operating knob 300, link member 305 connected to the pillar operating knob 300, and actuating member 306 connected to the edge of the link member 305. The pillar operating knob 300 is supported pivotally in the anterior posterior direction around supporting member 303 so as to be selectively kept in one state where the front end 301 is pushed down toward the right frame 2*b* by spring 304 which is attached to the rear end and another state where the rear end 302 is pushed down toward the right frame 2*b*. As shown in FIG. 6(*a*), the pillar operating knob 300 is arranged along the upper surface of the right frame 2*b*.

The link member 305 is formed in a rod-shape and, as shown in FIG. 6(*b*), one end of the link member 305 is connected to the lower portion of the front end 301 and the other end is connected to the actuating member 306. The actuating member 306 is formed in an elongated plate shape, and the base end of the actuating member 306 is supported by supporting shaft 307 so that it can pivot around the supporting shaft 307. The actuating member 306 is configured to support one end of the pillar 30 at the tip edge thereof and the link member 305 at the center thereof.

Thus, by virtue of the above pillar operating portion 300A, in response to the push-down operation of the front end 301 of the pillar operating knob 300 toward the right frame 2*b*, the link member 305 may move downwardly and the downward movement of the link member 305 may cause the actuating member 306 to move downwardly around the supporting shaft 307. As a result, the pillar 30 supported by the actuating member 306 may also move downwardly to cause the pillar 30 to move to the first position.

On the other hand, in response to the push-down operation of the rear end 302 of the pillar operating knob 300 toward the right frame 2*b*, the link member 305 may move upwardly and the upward movement of the link member 305 may cause the actuating member 306 to rotate upwardly around the supporting shaft 307. As a result, the pillar 30 supported by the actuating member 306 may also move upwardly to cause the pillar 30 to the second position.

Thus, the pillar 30 may be selectively moved either to the first position or second position by pushing down either the front end 301 or rear end 302 of the pillar operating knob 300. In one aspect of the disclosure, since the pillar operating portion 300A is separate from the clutch lever 53, the pillar 30 may be moved from the first position to the second position by pushing down the rear end 302 of the pillar operating knob 300 even in the clutch-on state where the pillar 30 is normally kept in the first position.

Thus, in accordance with various embodiments of the disclosure, the pillar 30 may be moved to the second position by operating the pillar operating knob 300 even during the unwinding operation of fishing reel in the clutch-on and drag-free state so as to reduce the resistance occurred during unwinding of fishing line. Thus, various aspects of the disclosure may achieve smooth unwinding of fishing line.

It should be appreciated that the pillar 30 may be configured such that it may be actuated in concert with the switching operation of the clutch lever 53. It is also possible to actuate the pillar 30 in concert with both the switching operation of the clutch lever 53 and the operation of the pillar operating knob 300. Furthermore, the pillar operating knob 300 and clutch lever 53 may be configured to be switched between the interlocked state and non-interlocked state.

Figure 9A:
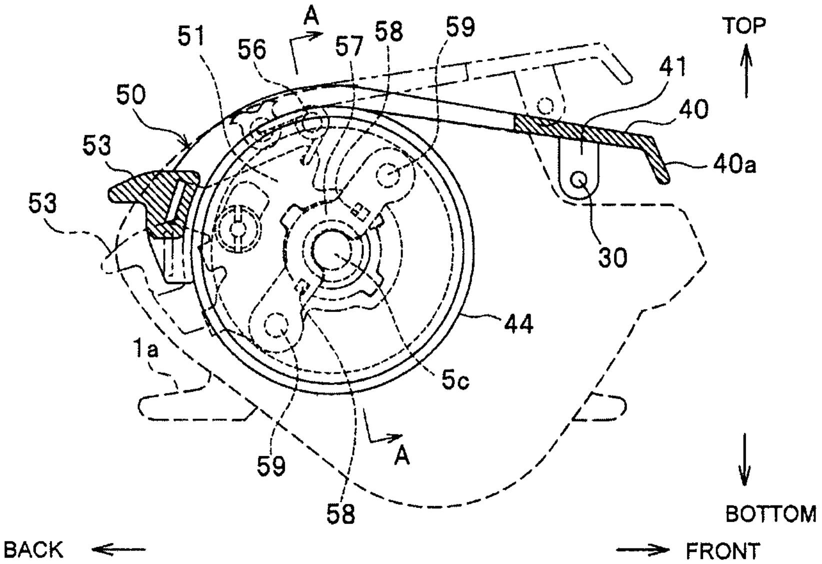
FIG. 9(*a*) is a sectional side view showing a thumb rest in accordance with one embodiment.
Figure 9B:
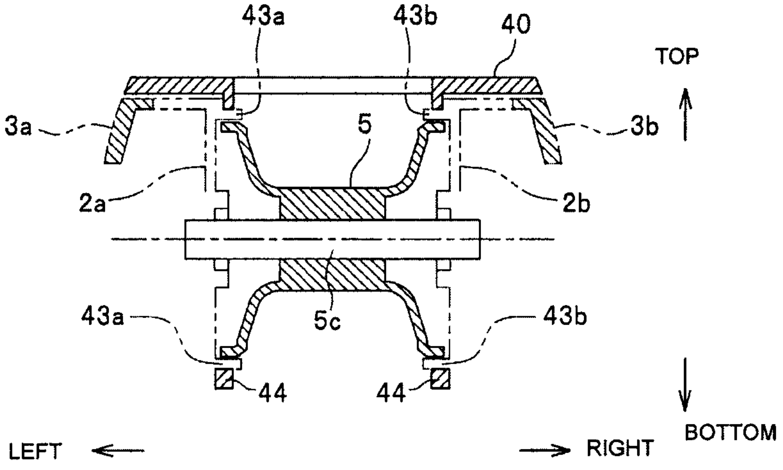

Now, with reference to FIGS. 7-9, another embodiment of a fishing reel will be described. The fishing reel in accordance with this embodiment is provided with thumb rest 40 which is located between the pair of side plates 2*a* and 2*b* of the reel body 1 so as to move in the vertical direction in response to the switching operation of the clutch lever 53.

Figure 7A:
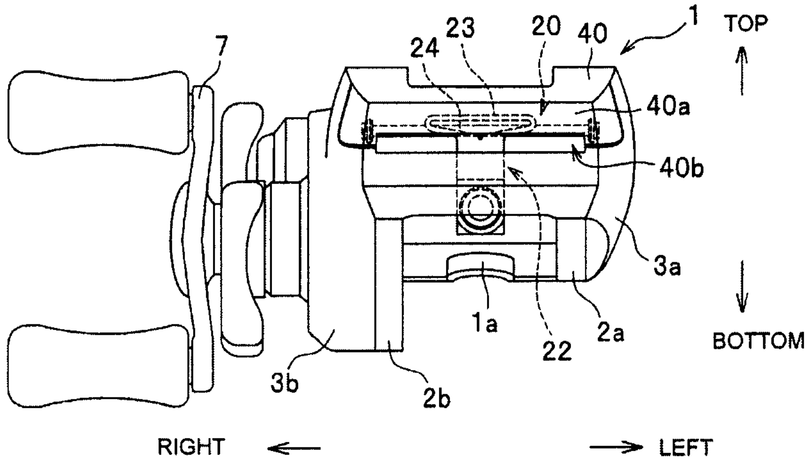
FIG. 7 shows a fishing reel in accordance with another embodiment.
Figure 7B:
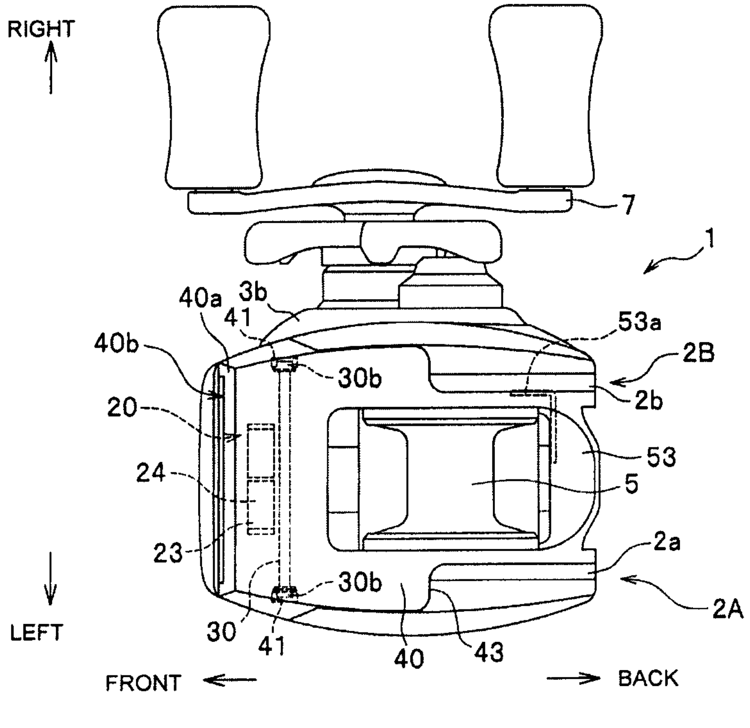
Figure 8B:
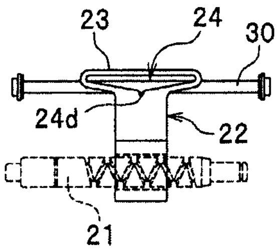
FIG. 8(*a*) and (*b*) show the geometry of various components of the fishing reel in winding a fishing line.
Figure 8A:
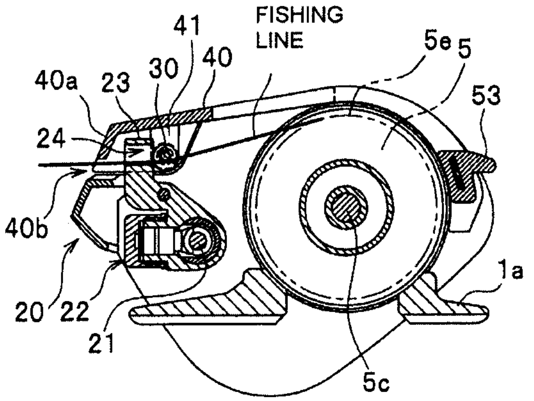
Figure 8D:
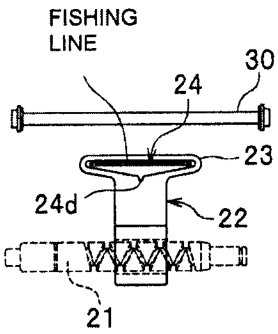
Figure 8C:
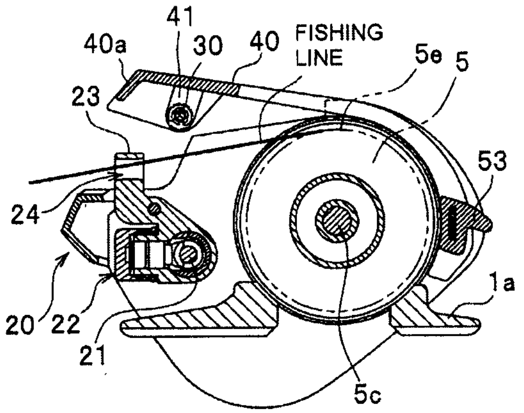

As shown in FIGS. 7(*a*)-(*b*), the front portion of the thumb rest 40 is configured to extend forwardly so as to cover the line guide 23, and, as shown in FIGS. 8 (*a*)-(*c*), the pillar 30 is rotatably supported via supporting member 41 on the lower surface of the thumb rest 40. As shown in FIG. 8(*a*), the pillar 30 is arranged so as to be positioned in rear of and in the vicinity of the line guide 23 while the thumb rest 40 is closed (i.e., while the pillar 30 is positioned at the first position by pivoting the tip end downwardly). The pillar 30 is configured to push down the fishing line to guide it into the fishing line guide groove 24*d*.

As shown in FIG. 7(*a*), the front end portion 40*a* of the thumb rest 40 is bent downwardly and aperture 40*b* is formed for accommodating fishing line at the lower portion of the front end portion 40*a*. The aperture 40*b* remains uncovered even when the thumb rest 40 is in the closed state (as shown in FIG. 8(*a*)) so as to allow the fishing line to travel through the aperture 40*b* during fishing line winding operation. As shown in FIG. 7(*b*), stepped portion 43 is formed on the center of the upper surface of the thumb rest 40, and the rear portion of the thumb rest 40 which is formed to have a narrow width in the right-and-left-direction extends rearwardly from the stepped portion 43. In one embodiment, clutch lever 53 is connected via the supporting member 53*a* to the rear end of the thumb rest 40. As shown in FIG. 9(*a*), circular portion 44 is integrally formed on the lower portion of the center of the thumb rest 40. As shown in FIG. 9(*b*), the circular portion 44 may be fit to projection 43*a*, 43*b* concentric to the spool shaft 5*c* disposed between the left and right bodies 2*a* and 2*b* at the outside thereof. The thumb rest 40 (the tip end thereof) is attached rotatably around the spool shaft 5*c* so as to be movable in the vertical direction in response to the switching operation of the clutch lever 53 by fitting the circular portions 44, 44 to the outside of the projections 43*a*, 43*b*.

Thus, the thumb rest 40 may move downwardly by switching the clutch lever 53 to the clutch-on state for winding the fishing line on the spool 5, and the downward movement of the thumb rest 40 may cause the pillar 30 to move to the first position to hold the fishing line in the center portion 24*c*' of the fishing line guide hole 24. On the other hand, the thumb rest 40 may be upwardly by switching the clutch lever 53 to the clutch-off state for unwinding the fishing line from the spool 5, and the upward movement of the thumb rest 40 may cause the pillar 30 to move to the second position to move the fishing line away from the center portion 24*c*' of the fishing line guide hole 24.

This embodiment may provide a fishing reel with good operability which allows various operations including unwinding operation of fishing line (casting operation of fishing device) and winding operation of fishing line to be performed smoothly. In addition, the thumb rest 40 is configured to move in concert with the pillar 30 so as not to interfere the movement of the pillar 30, thereby increasing the travel distance of the pillar 30 in the vertical direction. It is also possible to form line guide 23 with a large dimension in the vertical direction (height direction) and thereby to reduce the unwinding resistance (contact resistance) which might occur during fishing line unwinding operation between the inner surface of the fishing line guide hole 24 and the fishing line. Thus, a smooth unwinding of fishing line may be achieved. In addition, the downward movement of the pillar 30 may cause the thumb rest 40 to move downwardly so as to allow anglers to perform a winding operation of a fishing line while palming the fishing reel without any discomfort.

Now, with reference to FIGS. 10-11, another embodiment of a fishing reel will be described. The fishing reel in accordance with this embodiment is a modification of the fishing reel as shown in FIGS. 7-9. The fishing line of this embodiment is different than the embodiment in FIGS. 7-9 in that the pillar 33 is formed in the shape of casing surrounding the fishing line.

Figure 10A:
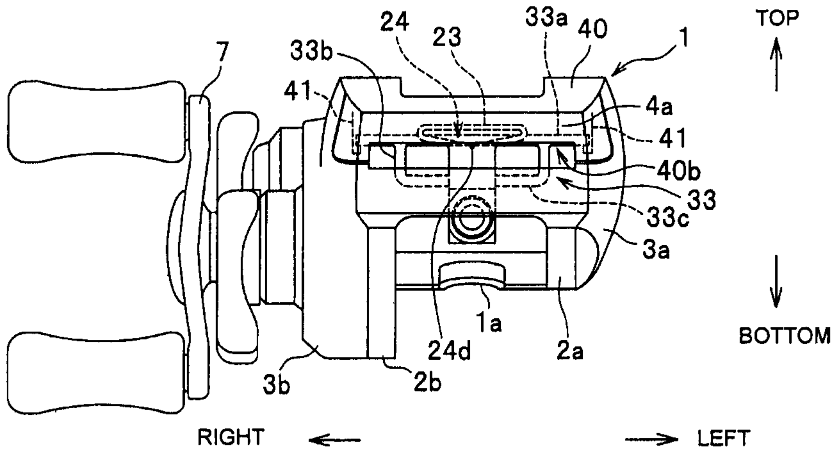
FIG. 10 shows a fishing reel in accordance with another embodiment.
Figure 10B:
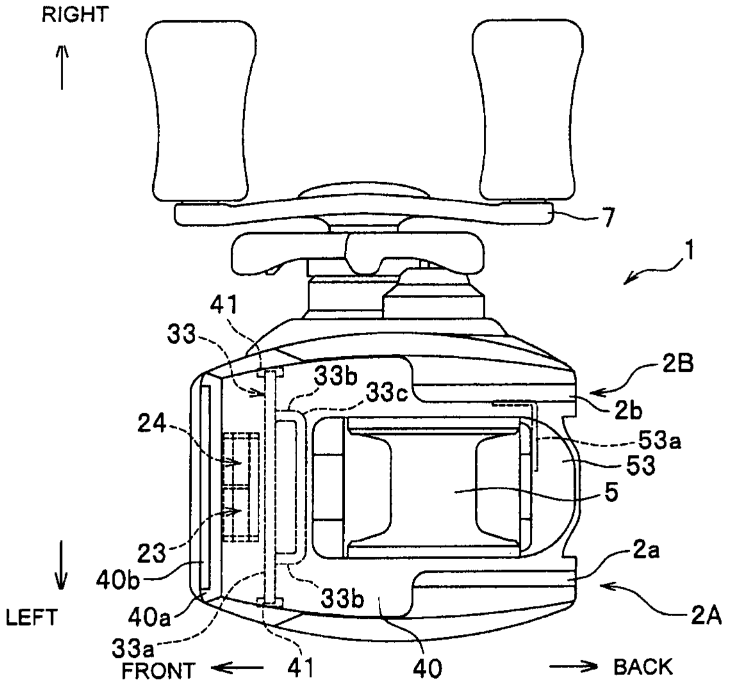
Figure 11B:
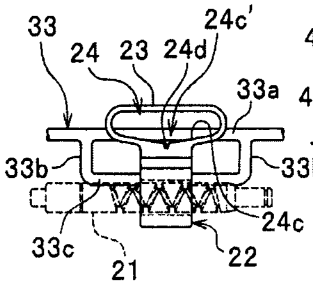
FIG. 11(*a*) and (*b*) show the geometry of various components of the fishing reel in winding a fishing line.
Figure 11A:
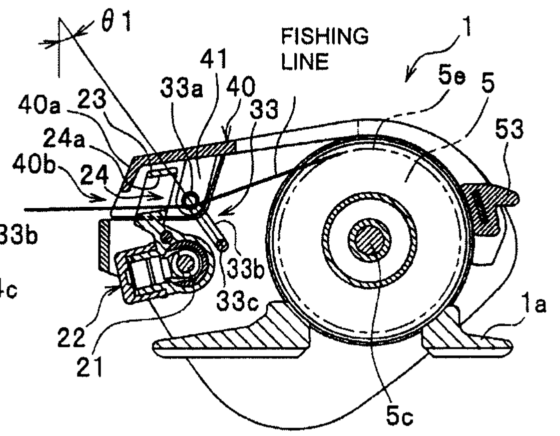
Figure 11D:
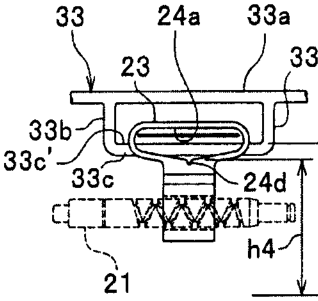
Figure 11C:
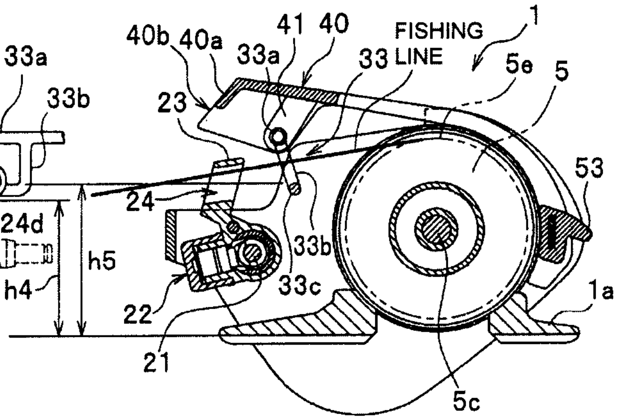

As shown in FIG. 10(*a*), the pillar 33 is formed to have a rectangular shape viewed from the front. The pillar 33 consists of upper portion 33*a*, lower portion 33*c*, and side portions 33*b*, 33*b* such that the fishing line can be inserted into the aperture defined by the pillar 33. The upper portion 33*a* is supported by supporting member 41, 41 attached to the lower front portion of the thumb rest 40 and fixed to the thumb rest 40. As shown in FIG. 11(*b*), the upper portion 33*a* is configured to guide the fishing line into the center portion 24*c*' of the fishing line guide hole 24 when the pillar 33 moves to the first position, thereby maintaining the fishing line in the center portion 24*c*' (fishing line guide groove 24*d*).

As shown in FIG. 11(*a*), the lower portion 33*c* is connected to the upper portion 33*a* via the side portions 33*b*, 33*b*. The lower portion 33*c* is located rear of the upper portion 33*a* while the thumb rest 40 is closed (while the pillar 33 stays at the first position) such that the side portions 33*b*, 33*b* is inclined backwardly at the angle $\theta 1$ with respect to the vertical reference plane.

As shown in FIGS. 11(*c*) and (*d*), during fishing line unwinding operation when the pillar 33 is positioned at the second position, the height h5 of fishing line contact surface 33*c*' of the lower portion 33*c* from the lower surface of the rod mounting leg 1*a* of the reel body 1, may be determined according to the following formulae:

$$h5>h4 \tag{6}$$

Thus, during fishing line winding operation, the height h5 is set to be higher than the height h4. Accordingly, the pillar 33 moves from the first position to the second position in response to switching from the clutch-on state to the clutch-off state by the operation of the clutch lever 53. The fishing line held in the fishing line guide groove 24*d* may be lifted by the lower portion 33*c* even in the event that the fishing line is stuck in the fishing line guide groove 24*d* due to, for example, water or extraneous matter or a sufficient tension is not applied to the fishing line. Thus, the fishing line is surely disengaged from the fishing line guide groove 24*d* so as to allow the fishing line to move from the inside of the guide groove 24*d* to the elongated space located at the upper portion of the fishing line guide hole 24. Accordingly, a smooth unwinding of fishing line may be achieved.

In addition, the upper portion 33*a* of the pillar 33 may be disposed upwardly apart from the fishing line which bridges between the upper inner surface 24*a* of the fishing line guide hole 24 and the fishing line winding position 5*e* of the spool 5 while the pillar 33 is positioned at the second position. Similarly, the lower portion 33*c* may be disposed downwardly apart from the fishing line. Thus, the upper portion 33*a* and lower portion 33*c* are retracted such that they are not in direct contact with the fishing line so as to guide the fishing line unwound from the spool 5 to the fishing line guide hole 24 of the line guide 23 without contacting the upper portion 33*a* and lower portion 33*c*. Thus, a smooth unwinding of fishing line may be achieved.

As described above, the thus configured pillar 33 is provided with the lower portion 33*c* disposed rear of the upper portion 33*a* such that the dimension of the aperture of the pillar 33 as projected onto vertical direction plane (not shown) viewed in the anterior posterior direction is larger at its second position than at its first position. Accordingly, the dimension of the aperture of the pillar 33 is larger during fishing line unwinding operation when the pillar 33 is located at the second position than that of the pillar 33 which stays at the first position, thereby achieving a smooth unwinding of the fishing line. On the other hand, the dimension of the aperture becomes smaller during fishing line winding operation when the pillar 33 is located at the first position than that of the pillar 33 which stays at the second position, thereby winding the fishing line more steadily and evenly.

It should be noted that the formula (6) does not necessarily need to be satisfied during fishing line unwinding operation when the pillar 33 stays at the second position.

Now, with reference to FIGS. 12 and 13, another embodiment of a fishing reel will be described. The fishing reel in accordance with this embodiment is a modification of the fishing reel as shown in FIGS. 10 and 11. The fishing line of this embodiment is different than the embodiment shown in FIGS. 10 and 11 in that the pillar 35 is located front of the, line guide 23.

Figure 12A:
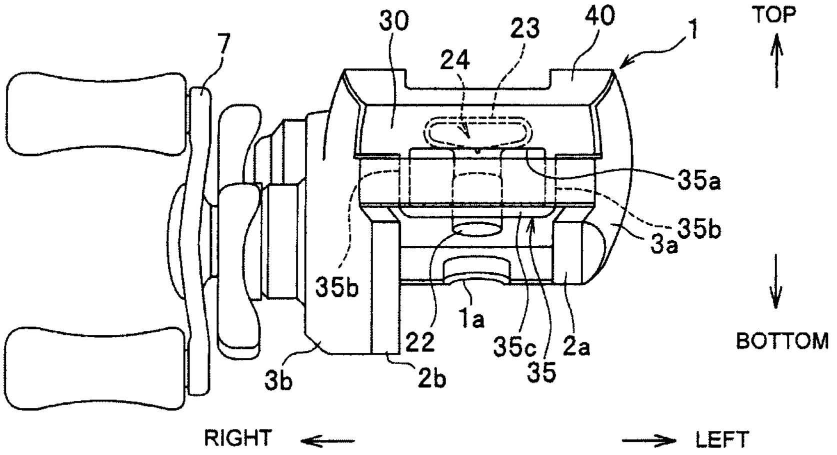
FIG. 12 shows a fishing reel in accordance with another embodiment.
Figure 12B:
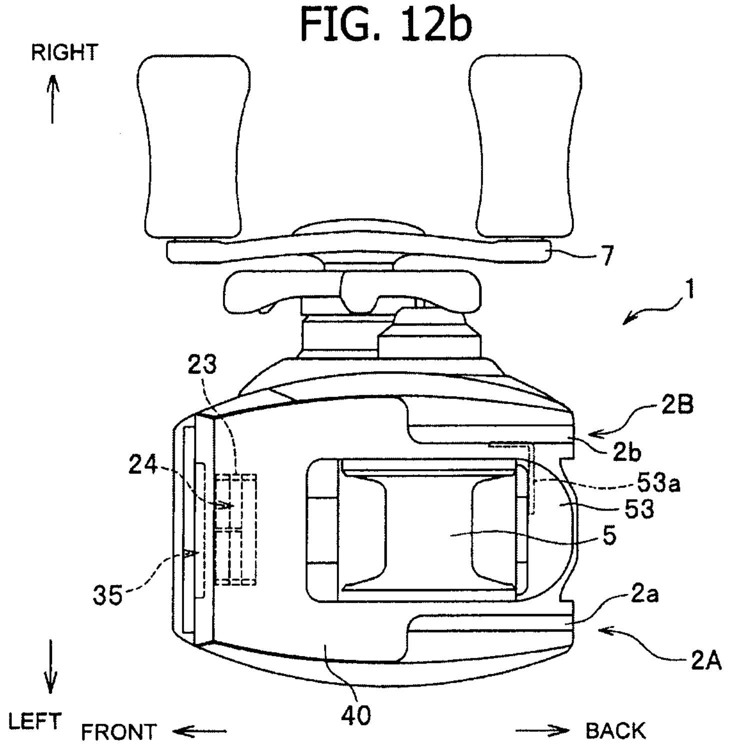

As shown in FIG. 12(*a*), the pillar 35 is formed to have a rectangular shape viewed from the front. The pillar 35 consists of upper portion 35*a*, lower portion 35*c*, and side portions 35*b*, 35*b* such that the fishing line can be inserted into the aperture defined by the pillar 35. The pillar 35 is formed integral with the lower front portion of the thumb rest 40. As shown in FIG. 13(*b*), the upper portion 35*a* is formed as a part of the lower of the front edge of the thumb rest 40 such that it can guide the fishing line into the center portion 24*c*' of the fishing line guide hole 24 to hold the fishing line in the center portion 24*c*'(fishing line guide groove 24*d*) when the pillar 35 moves to the first position. In this embodiment, the pillar 35 is disposed at the position where the substantially entire portion of the fishing line guide groove 24*d* is exposed beneath the upper portion 35*a* viewed from the front (i.e., the position corresponding to the height h4 as noted above).

As shown in FIG. 13(*a*), the lower portion 35*c* is connected to the upper portion 35*a* via the side portions 33*b*, 33*b*. The lower portion 35*c* is located beneath the spiral shaft 21 while the thumb rest 40 is closed (while the pillar 33 stays at the first position). In one aspect, the pillar 35 is disposed substantially vertically while the pillar 35 stays as the first position.

As shown in FIGS. 11(*c*) and (*d*), during fishing line unwinding operation when the pillar 35 is positioned at the second position, the height h5 of fishing line contact surface 35*c*' of the lower portion 35*c* from the lower surface of the rod mounting leg 1*a* of the reel body 1, may be determined according to the following formulae:

$$h6>h4 \quad (7)$$

Thus, during fishing line winding operation, the height h6 of the fishing line contact surface 35*c*' of the lower portion 35*c* is set to be higher than the height h4. Accordingly, the pillar 35 moves from the first position to the second position in response to switching from the clutch-on state to the clutch-off state by the operation of the clutch lever 53. The fishing line held in the fishing line guide groove 24*d* may be lifted by the lower portion 35*c* even in the event that the fishing line is stuck in the fishing line guide groove 24*d* due to, for example, water or extraneous matter or a sufficient tension is not applied to the fishing line. Thus, the fishing line is surely disengaged from the fishing line guide groove 24*d* so as to allow the fishing line to move from the inside of the guide groove 24*d* to the elongated space located at the upper portion of the fishing line guide hole 24. Accordingly, a smooth unwinding of fishing line may be achieved.

In addition, the upper portion 35*a* of the pillar 35 may be disposed upwardly apart from the fishing line which bridges between the upper inner surface 24*a* of the fishing line guide hole 24 and the fishing line winding position 5*e* of the spool 5 while the pillar 35 is positioned at the second position. Similarly, the lower portion 35*c* may be disposed downwardly apart from the fishing line. Thus, the upper portion 35*a* and lower portion 35*c* are retracted such that they are not in direct contact with the fishing line so as to guide the fishing line unwound from the spool 5 to the fishing line guide hole 24 of the line guide 23 without contacting the upper portion 35*a* and lower portion 35*c*. Thus, a smooth unwinding of fishing line may be achieved.

It should be noted that the formula (7) does not necessarily need to be satisfied during fishing line unwinding operation when the pillar 35 stays at the second position. The pillar 35 may be formed to consist solely of the upper portion 35*a*.

Figure 14C:
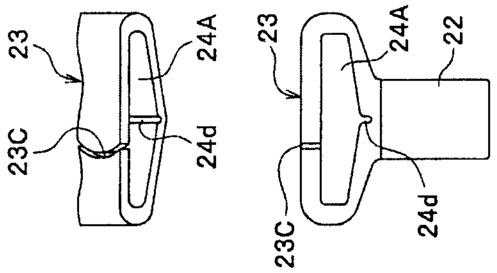
FIG. 14(*a*)-(*c*) show line guides in accordance with various embodiments.
Figure 14B:
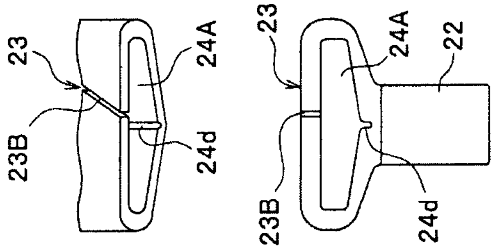
Figure 14A:
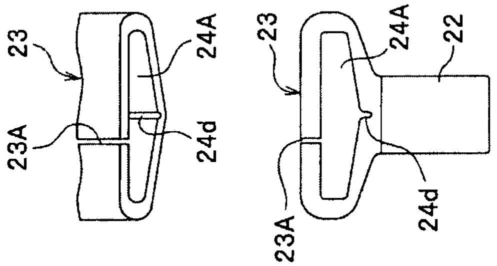

FIGS. 14(*a*)-(*c*) show a plurality of modifications of the line guide 23 in accordance with various embodiments. The line guide 23 shown in FIG. 14(*a*) is provided with an upper portion having cutout 23A extending in the anterior posterior direction through which a fishing line may be set in the aperture of the line guide 23. FIG. 14(*b*) shows one example of the line guide 23 having cutout 23B extending in the anterior posterior direction with an angle through which a fishing line may be set in the aperture of the line guide 23. FIG. 14(*c*) shows another example of the guide 23 having cutout 23C extending in the anterior posterior direction with a curvature through which a fishing line may be set in the aperture of the line guide 23.

As noted above, the line guide 23 with cutouts 23A, 23B or 23C allows the fishing line to be set into the fishing line guide hole 24 through the cutouts 23A, 23B or 23C more easily than directly inserting the fishing line into the fishing line guide hole 24. Accordingly, a fishing reel with good operability can be provided.

Since the cutouts 23B and 23C shown in FIGS. 14(*b*) and (*c*) are formed such that their axes do not match that of the fishing line during the fishing line unwinding and during fishing line winding operation, thereby allowing easy set of the fishing line into the fishing line guide hole 24 and preventing the fishing line from disengaging from the fishing line guide hole 24 during fishing line unwinding and winding operation.

It should be appreciated that although it is described that the center portion 24*c*' of the fishing line guide hole 24 is provided with the fishing line guide groove 24*d* in some embodiments, the fishing line guide groove 24*d* may be omitted. Instead, the fishing line may be held in the valley of the center portion 24*c*'.

It also should be appreciated that the pillar 30 formed in a cylindrical rod-shape as shown in FIGS. 1-6 may be formed into the shape of casing as described above in connection with FIG. 10(*a*). In one embodiment, a fishing reel may be provided with a pair of pillars disposed both front and rear of the line guide 23. In addition, although the line guide 23 is not movable in the right-and-left-direction during fishing line unwinding operation in the above examples, the line guide 23 may be formed to reciprocate in the right-and-left-direction in concert with the rotation of the spool 5 so that unwinding resistance of the fishing line can decrease.

It also should be appreciated that a fishing reel in one aspect may be formed such that the line guide 23 and pillar 30 (or pillar 33 or 35) move in the direction apart from one another upon switching to the drag-free state. In particular the clutch driving member 51 may be actuated upon switching to the drag-free state.

What is claimed is:

1. A fishing reel comprising:

a spool rotatably supported between a pair of side plates of a reel body;

a driving mechanism disposed on one of the pair of side plates;

a guide body disposed front of the spool, the guide body being movable in right-and-left-direction in response to rotation operation of a handle shaft of the driving mechanism so as to cause a fishing line to be wound around the spool;

a line guide disposed on the guide body; and a pillar;

wherein the line guide is provided with a fishing line guide hole formed in an elongated shape viewed from front of the guide body extending in the right-and-left-direction along an axis of the spool;

wherein the fishing line guide hole is provided with a lower inner surface including a slope extending downwardly toward a center portion of the lower inner surface;

wherein the pillar is disposed movable in a vertical direction in the vicinity in the anterior posterior direction of the line guide and is provided with a fishing line guide portion disposed along the axis of the spool; and wherein the pillar is configured to be movable between a first position where the fishing line is held in the center portion of the lower inner surface of the fishing line guide hole and a second position retracted from the first position, the pillar taking the first position by moving downwardly for fishing line winding operation so as to cause the fishing line guide portion to guide the fishing line to the center portion of the lower inner surface of the fishing line guide hole, the pillar taking the second position by moving upwardly for fishing line unwinding operation.

2. The fishing reel of claim 1, wherein the center portion of the lower inner surface of the fishing line guide hole of the line guide is provided with a fishing line guide groove into which the fishing line may be guided by the pillar during fishing line winding operation.

3. The fishing reel of claim 1, further comprising a clutch lever that may be switched between clutch-on state for winding the fishing line onto the spool and a clutch-off state for unwinding the fishing line from the spool, wherein the pillar moves to the first position upon switching the clutch lever to the clutch-on state and to the second position upon switching the clutch lever to the clutch-off state.

4. The fishing reel of claim 3, further comprising a thumb rest disposed on an upper portion of the reel body between the pair of side plates; wherein the thumb rest is configured to be movable in the vertical direction in response to switching operation of the clutch lever, and wherein the pillar is configured to move to the second position upon upward movement of the thumb rest and move to the first position upon downward movement of the thumb rest.

5. The fishing reel of claim 1, further comprising:

a clutch lever that may be switched between clutch-on state for winding the fishing line onto the spool and a clutch-off state for unwinding the fishing line from the spool; and a pillar operating portion provided on the reel body separate from the clutch lever;

wherein the pillar is configured to move to either the first or second position in response to operation of the pillar operating portion.

6. The fishing reel of claim 1, wherein the pillar is disposed between the spool and the line guide.

7. The fishing reel of claim 6, wherein the pillar is configured to move towards the spool in moving from the first position to the second position and configured to move towards the line guide in moving from the second position to the first position.

8. The fishing reel of claim 1, wherein the slope is formed to be flat such with an angle between 1° and 30° with respect to a horizontal surface.

9. The fishing reel of claim 8, wherein the fishing line guide hole is provided with an upper inner surface formed in parallel with the horizontal surface, and wherein a horizontal width of the fishing line guide hole is configured to be larger than a vertical height of the fishing line guide hole such that the fishing line guide hole is formed to be a rectangular shape extending in the right-and-left-direction.

10. The fishing reel of claim 1, wherein the pillar is supported rotatably both in a winding and unwinding directions.

11. The fishing reel of claim 1, wherein the pillar is formed into a rectangular casing shape as viewed from the front of the guide body surrounding the fishing line.

12. The fishing reel of claim 11, wherein the pillar is provided with upper, lower and a pair of side portions;

wherein the upper portion is configured to guide the fishing line into the center portion of the lower inner surface of the fishing line guide hole upon movement of the pillar to the first position so as to hold the fishing line in the center portion of the lower inner surface; and wherein the lower portion is configured to guide the fishing line upwardly from the center portion of the lower inner surface of the fishing line guide hole upon movement of the pillar to the second position so as to disengage the fishing line from the center portion of the lower inner surface.

13. The fishing reel of claim 1, wherein the following formulae are satisfied:

$h1 \geq h3 > h2$ and $h4 \geq h2$, during the fishing line winding operation; and $h1 \leq h3$ and $h2 > h3$, during the fishing line unwinding operation, wherein h1 represents a height of a fishing line winding position of the spool, h2 represents a height of a fishing line guide portion of the pillar, h3 represents a height of an upper inner surface of the fishing line guide hole, and h4 represents a height of a center portion of the lower inner surface of the fishing line guide hole each from a lower edge of the reel body.

* * * * *